(12) United States Patent
Hirota

(10) Patent No.: US 8,502,122 B2
(45) Date of Patent: Aug. 6, 2013

(54) INDUCTION HEATING SYSTEM AND INDUCTION HEATING METHOD OF METAL PLATE

(75) Inventor: Yoshiaki Hirota, Tokyo (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 321 days.

(21) Appl. No.: 12/450,855

(22) PCT Filed: Apr. 16, 2008

(86) PCT No.: PCT/JP2008/057791
§ 371 (c)(1),
(2), (4) Date: Oct. 14, 2009

(87) PCT Pub. No.: WO2008/130049
PCT Pub. Date: Oct. 30, 2008

(65) Prior Publication Data
US 2010/0108665 A1    May 6, 2010

(30) Foreign Application Priority Data

Apr. 16, 2007 (JP) ................................ 2007-107497
Apr. 15, 2008 (JP) ................................ 2008-106073

(51) Int. Cl.
*H05B 6/10* (2006.01)
*H05B 6/04* (2006.01)
*H05B 6/36* (2006.01)

(52) U.S. Cl.
USPC ............ 219/645; 219/646; 219/671; 219/672

(58) Field of Classification Search
USPC ................. 219/647, 645, 673, 646, 637, 624, 219/662, 671, 656, 600, 672; 118/639, 725, 118/500, 715
See application file for complete search history.

(56) References Cited

U.S. PATENT DOCUMENTS

| 3,031,555 | A |   | 4/1962  | Ross et al. |
|-----------|---|---|---------|-------------|
| 4,258,241 | A | * | 3/1981  | Soworowski ................ 219/656 |
| 4,751,360 | A | * | 6/1988  | Ross ............................ 219/645 |
| 4,778,971 | A | * | 10/1988 | Sakimoto et al. ............ 219/645 |
| 4,795,872 | A | * | 1/1989  | Hagisawa et al. ............ 219/645 |
| 5,126,522 | A | * | 6/1992  | Katayama et al. ........... 219/663 |
| 5,317,121 | A | * | 5/1994  | Katayama et al. ........... 219/672 |

FOREIGN PATENT DOCUMENTS

| JP | 62-281291   | 12/1987 |
| JP | 2002-043042 | 2/2002  |
| JP | 2002-151245 | 5/2002  |
| JP | 2005-209608 | 8/2005  |
| JP | 2007-95651  | 4/2007  |
| WO | 2006/088067 | 8/2006  |
| WO | 2006/088068 | 8/2006  |

OTHER PUBLICATIONS

International Search Report dated Jul. 15, 2008 issued in corresponding PCT Application No. PCT/JP2008/057791.

* cited by examiner

*Primary Examiner* — Quang Van
*Assistant Examiner* — Hung D Nguyen
(74) *Attorney, Agent, or Firm* — Kenyon & Kenyon LLP

(57) ABSTRACT

The invention provides an induction heating system and method of using it for heating a metal plate. The induction coil of the induction heating system includes sections each having conductors at front and back surfaces of the metal plate, which are arranged such that at least a one of the front or back surface conductor has a part slanted in the width direction of the metal plate, and vertical projections of the conductors onto the metal plate do not overlap at the center of the metal plate but overlap outside the edges of the metal plate. In addition, front conductors from adjacent sections are spaced differently as back conductors. The induction heating system allows for better control of the heating temperature distribution regardless of the metal plates thickness and magnetic properties, especially temperature distributions at the edges of the metal plate.

9 Claims, 16 Drawing Sheets

PRIOR ART

ARROWS SHOW DIRECTION OF COIL CURRENT

⊗ SHOW DIRECTION OF INDUCTION CURRENT

PRIOR ART

ARROWS, ⊙, AND ⊗ SHOW DIRECTION OF INDUCTION CURRENT

PRIOR ART

*1 ARROWS SHOW DIRECTION OF COIL CURRENT
*2 BOLD LINES SHOW INDUCTION COIL CONDUCTOR AT FRONT SIDE OF METAL PLATE, WHILE BROKEN LINES SHOW INDUCTION COIL CONDUCTOR AT BACK SIDE OF METAL PLATE

INDUCTION HEATING SYSTEM AND INDUCTION HEATING METHOD OF METAL PLATE

This application is a national stage application of International Application No. PCT/JP2008/057791, filed 16 Apr. 2008, which claims priority to Japanese Application Nos. 2007-107497, filed 16 Apr. 2007; and 2008-106073, filed 15 Apr. 2008, each of which is incorporated by reference in its entirety.

TECHNICAL FIELD

The present invention relates to an induction heating system and induction heating method for an iron, aluminum, or other ferrous or nonferrous metal plate. The present invention particularly relates to an induction heating system and induction heating method able to precisely control the temperature of a metal plate for heating in particular in an induction heating system that efficiently heats a metal plate even in a nonmagnetic state irrespective of the metal plate being thin or thick.

BACKGROUND ART

Induction heating of metal by a high frequency current is widely being used for quenching and other heat treatment. It is being used as a heating system for replacing indirect heating by conventional gas heating and electric heating with the object of controlling the material quality of steel plate, aluminum plate, and other ferrous and nonferrous thin-gauge plate during the production process and, further, with the object of increasing the heating speed to improve productivity and freely adjust production volume, etc.

There are generally two systems for induction heating a metal plate. One is an induction heating system called the "LF (longitudinal flux heating) system" running a high frequency current through an induction coil surrounding the circumference of a metal plate to generate flux which passes through the metal plate in the longitudinal direction and generates an induction current inside the cross-section of the metal plate to heat it. The other is the "TF (transverse flux heating) system" arranging a metal plate between good magnetic bodies called inductors around which primary coils are wound, running current through the primary coils to generate flux, and passing these through the inductors so as to make the flux running between the inductors cut across the metal plate transversely and thereby generate an induction current at the plane of the metal plate and induction heating it.

The LF system of induction heating provides good temperature distribution uniformity, but the generated induction current circulates inside the plate cross-section. Due to the relationship of the current penetration depth, when the plate is thin, it is necessary to raise the frequency of the power source or else no induction current will be produced. Further, with a nonmagnetic material or even a magnetic material in which Curie point temperature is exceeded, the current penetration depth will become deeper, so there is the problem that thin plate cannot be heated.

On the other hand, the TF system of induction heating has the flux pass through the plane of the metal plate, so is characterized by being capable of heating irrespective of thickness or being magnetic or nonmagnetic and is characterized by using inductors with low magnetic resistance and thereby being capable of reducing the leakage flux and by being capable of concentrating the flux between the inductors facing the front and back of the metal plate, so having a high heat efficiency.

On the reverse side, there is the problem that uneven temperature distribution is liable to occur and the problem that when the metal plate is not at the center of the facing inductors, a magnetic material will be drawn to one of the inductors and greater temperature deviation will more easily be caused. Further, there is the defect that in the case of the TF system of induction heating, it is difficult to handle changes in width of the metal plate and snaking in continuous processing lines.

To solve these problems, Japanese Patent Publication (A) No. 2002-43042 discloses arranging single-turn coils of the front surface and back surface of a strip in the direction of progression offset in the direction of progression. Further, Japanese Patent Publication (A) No. 2002-151245 proposes a diamond-shaped induction coil where the long axis of the induction heating coil facing the heated material curves in the width direction of the heated material. Further, in Japanese Patent Publication (A) No. 2005-209608, the inventors proposes shifting an induction coil circling a metal strip in the width direction in the direction of progression at the front surface side and back surface side of the metal plate.

SUMMARY OF INVENTION

FIG. 1 is a schematic view showing a conventional LF system of induction heating. This surrounds a heated material, that is, a metal plate 1, in the width direction by an induction coil 2 connected to a high frequency power source 11 and runs a primary current 5 through it whereby a flux 4 runs through the inside of the metal plate 1, an induction current is generated around the flux 4, and the generated induction current heats the metal plate 1. FIG. 2 is a cross-sectional schematic view showing a state of an induction current being generated inside the cross-section of the metal plate 1.

Due to the flux 4 running through the metal plate 1, induction currents 6a, 6b run through the cross-section of the metal plate 1 in directions opposite to that of the primary current 5 which runs through the induction coil 2. These induction currents 6a, 6b flow concentrating at a range of current penetration depth δ shown by <1> from the surface of the metal plate 1.

$$\delta[\text{mm}] = 5.03 \times 10^5 (\rho/\mu_r f)^{0.5} \qquad <1>$$

where, ρ: Specific resistance [Ωm], μr: Relative magnetic permeability [-], f: Heating frequency [Hz]

The generated induction currents 6a, 6b flow in the opposite directions at the front and the back of the plate cross-section as shown in FIG. 2, so if the current penetration depth δ becomes deeper, the induction currents at the front and back of the plate cancel each other out and, as a result, current stops running in the plate cross-section.

Metal rises in ρ along with a rise in temperature, so the δ becomes deeper along with the rise in temperature. Further, a ferromagnetic material or paramagnetic material decreases in μr as the temperature becomes closer to the Curie point. When over the Curie point, the μr becomes 1. Further, the nonmagnetic material also has a μr of 1. If the μr becomes smaller, according to <1>, in a nonmagnetic material, or in the case of a magnetic material, at a temperature region from immediately before the Curie point to exceeding the Curie point, the current penetration depth δ deepens and, with thin heated materials, heating ends up becoming impossible.

For example, when the heating frequency is 10 kHz, the current penetration depth δ at ordinary temperature is approximately 1 mm for non-magnetic aluminum, approximately 4.4 mm for SUS304, and approximately 0.2 mm for magnetic material steel, while the current penetration depth of magnetic material steel at 750° C. or over the Curie point is approximately 5 mm.

To prevent the front and back currents generated inside the plate from cancelling each other out, the thickness must be at the minimum no less than 10 mm. To input power with good efficiency, a thickness of about 15 mm is required. In general, heat treatment is carried out on plates with a wide range of thicknesses such as from 10-odd μm foil-like thin sheets to thick plates exceeding 100 mm.

For example, steel plates for automobiles and home electric appliances, typical materials among the large amount of metal plates used, mostly have a thickness of less than about 3 mm after normal cold rolling. In particular, they often are 2 mm or less. To heat these materials by the LF system, the heating frequency must be raised to over several hundred kHz, however, there are hardware limitations in preparing a high frequency power source with a high capacity. This often makes realization on an industrial scale difficult.

The method of Japanese Patent Publication (A) No. 2002-43042 is considered to be one type of TF system where induction coils are arranged above and below a plate. Fluxes generated in the direction of progression of the metal plate are alternately generated in opposite directions, however, the upper and lower coils are offset, so regions where the fluxes generated at the upper and lower coils cancel each other out and regions where the fluxes cross the strip at a slant are alternately formed and therefore, it is believed, flux concentration can be prevented.

Therefore, it is believed that the conventional TF system has the effect of alleviating the problem of the flux concentrating at the edge parts and causing the edge parts to overheat. However, because regions where the fluxes cancel each other out are formed and because the coils are single-turn ones, the value of the current run through the coils to input power to the strip and raise the field strength has to be made larger, the copper loss of the coil increases, etc., so there is the problem that the efficiency easily falls.

Further, to increase efficiency, as disclosed in the examples in the above publication, it is necessary to bring the upper and lower single-turn coils in proximity to the strip. However, the strip being run will deform in shape or vibrate, so it is difficult to heat a wide, long stretch while running it.

Further, the method of Japanese Patent Publication (A) No. 2002-151245 is a method providing an induction heating coil widest at the center of the width direction in the conveyance direction of a metal substrate so that it faces the surface of the metal substrate and substantially making uniform the total of the induction coil width along the conveying direction of the metal substrate. However, this method is one which carries out heating with the leakage flux from the induction coil made to face the metal substrate, so there is no guarantee that the flux will pass through the metal substrate if the distance from the induction coil increases. Unless in proximity to the metal material, heating will be difficult to start up. Further, if the shape of the metal substrate is poor and the distance from the induction coil changes, a large temperature deviation will be generated.

Further, the induction coil is made one with a diamond shape so that the width of the induction coil becomes substantially the same width as the metal substrate in the direction of progression, however, with this shape, it is impossible to handle changes in width of the metal substrate. The induction coil is provided with a rotation mechanism, however, when rotating, the heating time does not become the same as with the direction of progression, therefore uniform temperature becomes difficult to achieve. A rotation mechanism of a heating system running a large current is in practice extremely difficult to realize on an industrial scale.

Neither of the above patent literatures discloses heating inside a closed loop formed by an induction coil surrounding a metal material, so there is no guarantee that the flux would reliably pass through the metal material and the result would be easily affected by distance from the induction coil. Further, the number of turns of the induction coil cannot be changed, so controlling the flux density is difficult.

As opposed to this, Japanese Patent Publication (A) No. 2005-209608 shows that, to solve the above problems in the heating systems, offsetting induction coils surrounding the metal plate in the width direction in the direction of progression of the metal plate to thereby generate independent currents so that the induction currents generated by the front and back induction coils inside the metal plate immediately below the induction coils facing the metal plate front and back do not interfere with each other enables heating even of a metal plate with a thickness less than or equal to the current penetration depth or even of a nonmagnetic metal plate.

Further, the induction coils surround the metal plate in a closed loop, so the flux always crosses the metal plate. Therefore, there is also the large practical advantage that even if the induction coil and the metal plate are comparatively separated from each other, heating can be easily carried out.

In this regard, the induction current generated at the center of the metal plate easily concentrates resulting in a high current density when running through the ends of the metal plate, and the front and the back induction coils are separated in the direction of progression, so the time that induction currents run through the ends becomes longer. Therefore, there was the problem of the ends of the metal plate easily being overheated and the conditions for obtaining a distribution with low temperature deviation (front and back induction coil offset, induction coil width, etc.) becoming extremely narrow.

The above three systems all can heat non-magnetic materials, but precise control of the heating temperature distribution is difficult. When considering the deformation of the metal plate or, when set in the middle of an existing furnace etc. the thickness of the insulating materials or the runnability, it is difficult to make the distance between the metal plate and induction coils narrower.

Further, the method of controlling the density of the current run and the heating time has been proposed and the method of dealing with snaking and changes in width has been proposed. With the methods of WO2006/088067 and WO2006/088068 and Japanese Patent Publication (A) No. 2007-95651, in comparison to the above explained three systems, broad control of the temperature distribution is possible, but depending on the conditions, there had been cases where the temperature deviation of the ends of the metal plate and the center part could not be sufficiently eliminated.

The present invention solves the problems of induction heating of metal plates in these conventional LF systems and TF systems and has as its object to provide an induction heating system and induction heating method using an induction coil which, not limited to magnetic materials but also in nonmagnetic materials and in nonmagnetic regions, sufficiently maintain the distance between the metal plate and the induction coil, are superior in temperature controllability more so than the induction heating systems set forth in WO2006/088067 and WO2006/088068, enable changes in width, snaking, etc. to be effectively handled, and enable efficient heating.

The present invention was made to solve the above problems and has as its gist the following:

(1) An induction heating system of metal plate having an induction coil formed connecting a conductor at a front surface side of the metal plate and a conductor at a back surface side so as to circle a width direction of the metal plate while having a distance from the surface of the metal plate and induction heating the metal plate passing through the inside of the circling induction coil, said system characterized by arranging at least two sections of said induction coil adjoining in a longitudinal direction of said metal plate, and, in a vertical projection when vertically projecting the conductors forming the induction coil at the front surface side and back surface side of said metal plate onto said metal plate, said front surface side conductor and back surface side conductor being arranged having a distance apart so as not to mutually overlap each other in a longitudinal direction of said metal plate at the center part of said metal plate at each of said at least two sections of the induction coil, and, further, at said adjoining at least two sections of the induction coil, said front surface side conductors being in proximity in the longitudinal direction of the metal plate and said back surface side conductors being arranged having a distance apart in the longitudinal direction of the metal plate more than the distance by which said front surface side conductors are in proximity, or said back surface side conductors being in proximity in the longitudinal direction of the metal plate and said front surface side conductors being arranged having a distance apart in the longitudinal direction of the metal plate more than the distance by which said back surface side conductors are in proximity.

(2) An induction heating system of metal plate having an induction coil formed connecting a conductor at a front surface side of the metal plate and a conductor at a back surface side so as to circle a width direction of the metal plate while having a distance from the surface of the metal plate and induction heating the metal plate passing through the inside of the circling induction coil, said system characterized by arranging at least two sections of said induction coil adjoining in a longitudinal direction of said metal plate, said front surface side conductor and back surface side conductor being arranged having a distance apart so as not to mutually overlap each other in a longitudinal direction of said metal plate at the center part of said metal plate at each of said at least two sections of the induction coil in a vertical projection when vertically projecting the conductors forming the induction coil at the front surface side and back surface side of said metal plate onto said metal plate, at least either of said front surface side and back surface side conductors of each of said at least two sections of the induction coil having a part slanted with respect to the width direction toward at least either of the ends of the metal plate in the width direction, and, further, at said adjoining at least two sections of the induction coil, said front surface side conductors being in proximity in the longitudinal direction of the metal plate and said back surface side conductors being arranged having a distance apart in the longitudinal direction of the metal plate more than the distance by which said front surface side conductors are in proximity, or said back surface side conductors being in proximity in the longitudinal direction of the metal plate and said front surface side conductors being arranged having a distance apart in the longitudinal direction of the metal plate more than the distance by which said back surface side conductors are in proximity.

(3) An induction heating system of metal plate as set forth in (1) or (2), characterized in that the system is designed so that when running an alternating current to said induction coil, current of the same direction and same phase runs to the conductors in proximity.

(4) An induction heating system of metal plate as set forth in (2) or (3), characterized in that at least either of said front surface side and back surface side conductors of the induction coil arranged at the outermost side in the longitudinal direction of said metal plate is arranged having a part slanted with respect to the width direction toward at least either end of said metal plate in the width direction, and at an outside of a slanted part of a conductor having a slant arranged at the outermost side, a magnetic core extending from the front surface side to the back surface side of said metal plate is provided so as to cover at least a width direction end of said metal plate.

(5) An induction heating system of metal plate as set forth in (4) characterized in that said magnetic core has a mechanism for moving in a horizontal direction and can change an amount of the metal plate covered from the end.

(6) An induction heating system of metal plate as set forth in any one of (2) to (5), characterized in that at least one of a front surface side conductor and back surface side conductor of the induction coil has a mechanism enabling movement in a width direction of the metal plate, and a conductor arranged so as to have a part slanted with respect to the width direction can change the position of the slanted part with respect to the metal plate in the width direction.

(7) An induction heating method of metal plate using an induction heating system of metal as set forth in any one of (2) to (6), said induction heating method characterized by passing a metal plate through an inside of an induction coil of said induction heating system, running alternating current to said induction coil to run current of the same direction and same phase to conductors in proximity of said induction coil and thereby generate inside said metal plate a master induction current having substantially the same shape as a vertical projection onto said metal plate of said front surface side and back surface side conductors at said at least two sections of the induction coil of said induction heating system and having a direction opposite to the direction of the alternating current flowing through said front surface side and back surface side conductors due to said run current and, in a region at the outside of a slanted part of a conductor arranged to have a slant with respect to the width direction of said metal plate and sandwiched between said adjoining sections of the induction coils in a vertical projection of said front surface side and back surface side conductors onto said metal plate, generating a minor loop of a slave induction current generated by one of said adjoining sections of the induction coil and a minor loop of a slave induction current of the other in opposite directions so as to cancel out the minor loop and heat the metal plate while preventing generation of a slave induction current.

(8) An induction heating method of metal plate as set forth in (7), comprising an induction heating method of metal plate using an induction heating system of metal plate as set forth in (5) or (6), characterized by changing the amount by which said magnetic core covers the metal plate from the end so as to change the temperature distribution of the end of the metal plate.

(9) An induction heating method of metal plate as set forth in (7), comprising an induction heating method of metal plate using an induction heating system of metal plate as set forth in (6), characterized by making at least one of the front surface side conductor and back surface side conductor of an induction coil move in a width direction of the metal plate and adjusting a position of the slanted part of said conductor with respect to the metal plate so as to adjust a temperature distribution of said metal plate.

Note that, the "longitudinal direction of the metal plate" referred to in the present invention is the running direction of the metal plate (the same direction as the conveyor line). Further, the "LF system" referred to in the present invention is to a conventional longitudinal flux system giving an alternating magnetic field to a non-heated object in the axial direction.

By using the induction heating system and induction heating method according to the present invention, not only is the heating of thick materials and thin plates of magnetic regions possible, but what had been impossible under conventional heating systems, that is, heating of thin, small specific resistance, nonmagnetic aluminum, copper, and other nonferrous metal plates and heating in the nonmagnetic region of a temperature of the Curie point or more in iron and other magnetic materials are possible.

Further, by increasing the temperature of the center part of the metal plate and suppressing the temperature increase at the ends of the metal plate, the temperature distribution of the entire metal plate can be controlled and overheating of the ends of the metal plate can be suppressed or prevented.

Further, by taking into account the elimination of temperature deviation of the metal plate in the induction heating system carried over from the preceding steps and the temperature characteristics of the metal plate at the succeeding steps and heating according to the desired temperature distribution and otherwise heating with a heating speed and temperature distribution matching the desired metallurgical characteristics demanded, high quality products can be stably made and the effects on quality of fluctuations in operation can be eliminated.

Furthermore, there are no effects of thermal inertia which become problems in gas heating furnaces, so even when the temperature of the furnace has to be changed due to changes in the thickness and width of the metal plate or the type of the material, the heating rate can be freely controlled, so the running speed does not have to be changed. Therefore, not only are the linking materials that are normally necessary in a gas heating furnace until the furnace stabilizes when changing the furnace temperature not required, but also production can be continued without the running speed dropping, therefore a drop in productivity can be avoided and freedom in the operation plan is greatly improved.

Further the induction heating system of the present invention is not only able to handle changes in the thickness and width of a metal plate, but can flexibly handle snaking and other causes of fluctuation. Further, not only is the desired temperature distribution obtained, but the use of multiple sets of induction coils due to plate width is unnecessary, thereby making the capital cost lower as well.

BRIEF DESCRIPTION OF THE DRAWINGS

FIG. 9($b$) is a plan schematic view explaining an induction heating system according to the present invention and shows a case of two sections of the induction coil connected in parallel.

FIG. 18($b$) is a schematic view showing the induction currents generated in a metal plate when an end of a metal plate passes through the A line of FIG. 18($a$).

FIG. 18($c$) is a schematic view showing the induction currents generated in a metal plate when an end of a metal plate passes through the B line of FIG. 18($a$).

FIG. 18($d$) is a schematic view showing the induction currents generated in a metal plate when an end of a metal plate passes through the C line of FIG. 18($a$).

EMBODIMENTS OF INVENTION

Below, embodiments of the present invention will be explained. To simplify the explanation, the case of 2T (turns) as two sections of the induction coil (1 section, 1 turn) will be explained using the drawings, however, the invention is not limited to 2T. A plurality of Ts or 1T parallel connection is also possible.

Figure 9A:
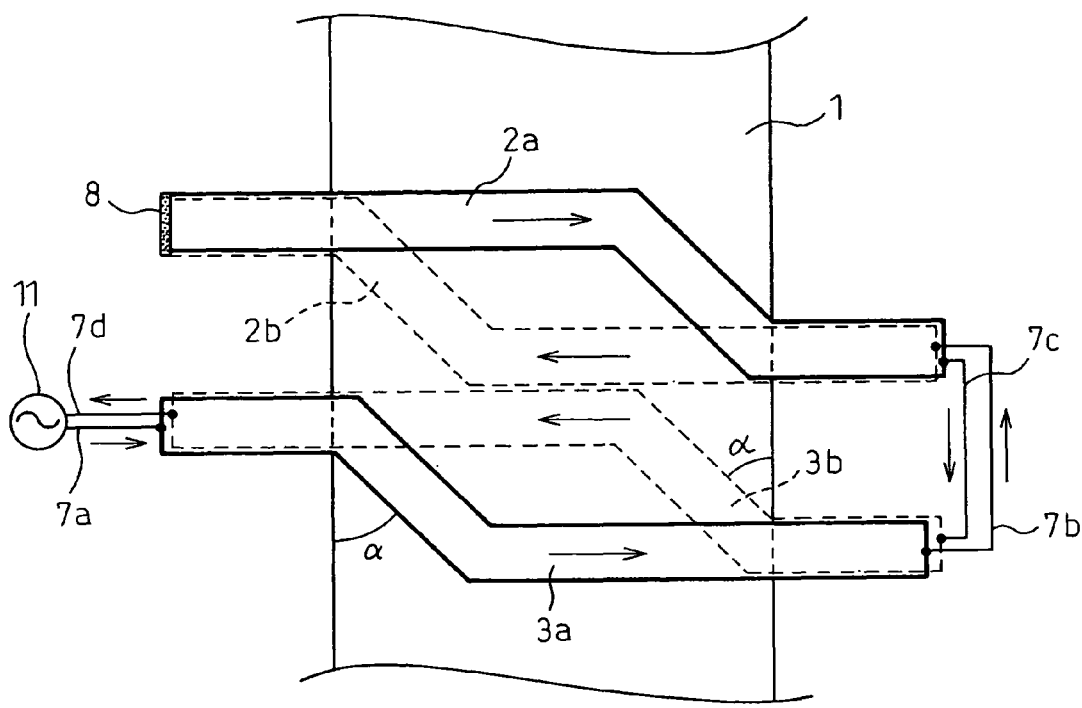
FIG. 9($a$) is a plan schematic view explaining an example of an induction heating system according to the present invention and shows a case of two sections of the induction coil connected in series.
Figure 10:
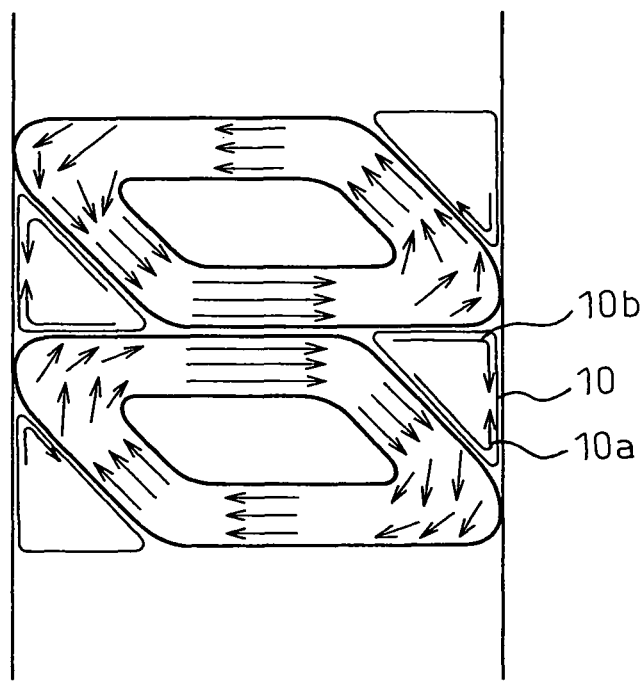
FIG. 10 is a plan schematic view explaining the distribution of induction currents generated in a metal plate by the induction heating system according to the present invention of FIG. 9($a$).

FIG. 9(a) is a plan schematic view showing one example of an induction heating system of the present invention, while FIG. 10 is a schematic view showing the induction currents generated in the metal plate 1 in FIG. 9(a).

The "induction coil" used in the explanation of the present invention below is used as the general term for a coil formed by a conductor comprised of a pipe, wire, plate, etc. made of a good electrical conductor wound around a heated material, that is, a metal plate, having a distance from its surface and by at least one turn in a width direction of the metal plate. It does not particularly define the shape surrounding the heated material as rectangular or circular. When wound by two or more turns, the conductors of the different turns (T) are set adjoining each other.

Note that, each turn, as will be explained later, includes the front surface side conductor and the back surface side conductor connected by connecting conductors or conductive members at the outer sides of ends of the heated material (metal plate) in the width direction so as to circle the material.

The conductor is preferably a material with good electrical conductivity such as copper or aluminum. Further, "one section of the induction coil" referred to in the present invention is comprised of the front and back induction coil conductors wound once around the metal plate and is the smallest unit which makes up an induction coil and "two sections" indicates two pairs of front and back induction coil conductors.

Note that, in the following FIG. 7, FIG. 9(a), FIG. 9(b), FIG. 11, FIG. 12, FIG. 16, and FIG. 17, the arrows indicate the directions of the coil currents, the bold lines indicate the induction coil conductors at the front side of the metal plate, and the broken lines indicate the induction coil conductors at the back surface of the metal plate. Further, in the following FIG. 8 and FIG. 10, the arrows indicate the directions of the induction currents generated inside the metal plate.

The principle of induction heating of a metal plate according to the present invention will be explained below using the drawings.

Figure 1:
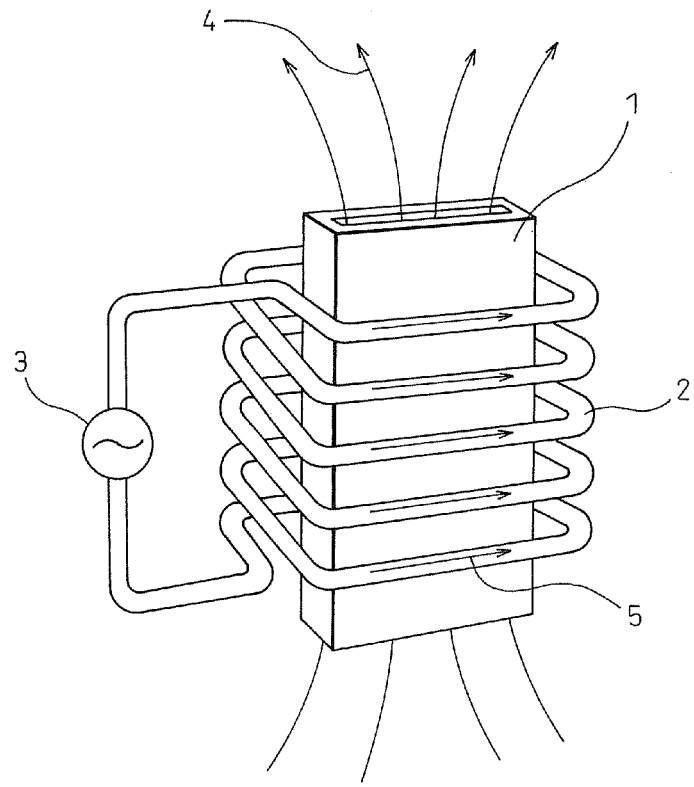
FIG. 1 is a schematic view showing conventional LF-type induction heating.
Figure 2:
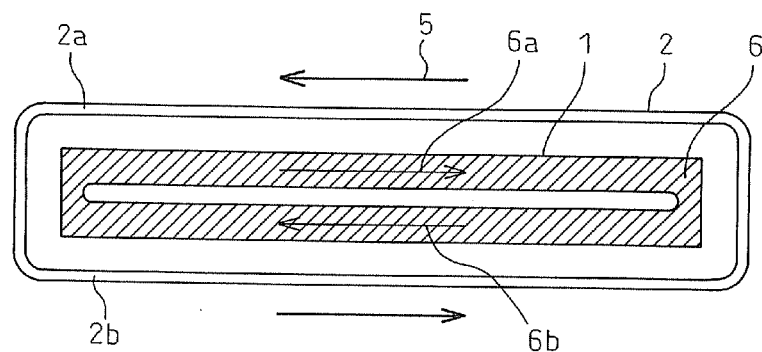
FIG. 2 is a cross-sectional schematic view explaining the induction currents running in the cross-section of a thin metal plate in conventional LF-type induction heating.
Figure 3:
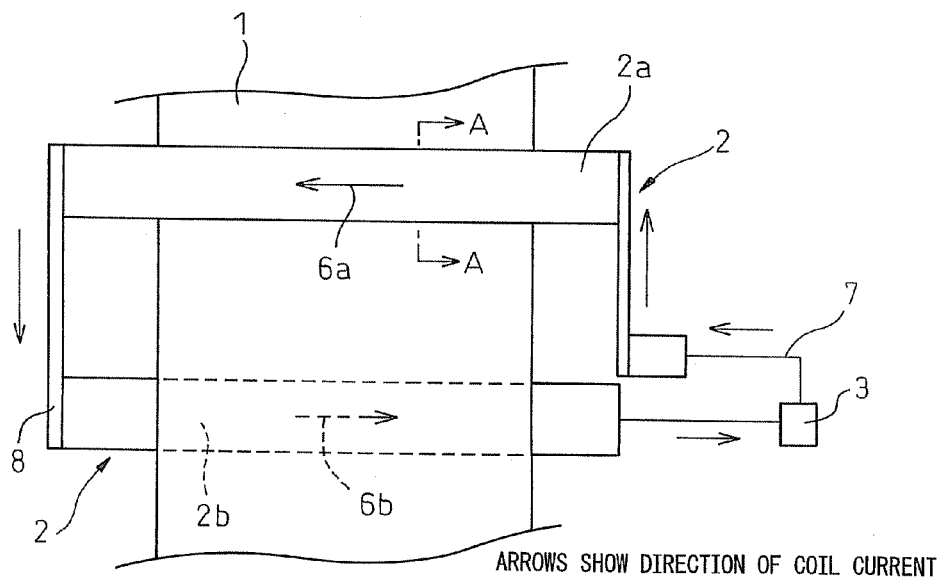
FIG. 3 is a plan schematic view explaining induction heating in which conductors at the front and back of the coil are arranged offset.

In the present invention, first, as shown in FIG. 3, the conductors are arranged so that when the conductor 2a and 2b making up the induction coil at the front surface side and back surface side of the metal plate 1 passing through the inside of the induction coil 2 are vertically projected on the metal plate, the vertical projections of the front surface side and the back surface side conductors have a distance (offset) from each other in the longitudinal direction of the metal plate.

Figure 4:
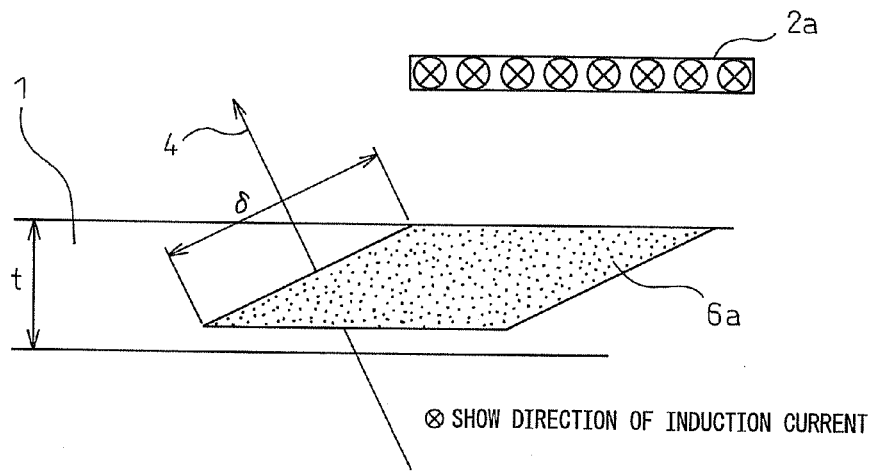
FIG. 4 is a cross-sectional schematic view explaining the mechanism of generation of current at the A-A cross-section of FIG. 3.

This being so, as shown by the side cross-sectional view of FIG. 4 (explained only for the 2a conductor for simplicity), the metal plate 1 is penetrated by a slanted flux 4. This flux causes an induction current 6a to be generated.

Accordingly, due to the expansion of the current path at a slant, even if the penetration depth δ of the induction current 6a generated is greater than the plate thickness t, the induction current will run.

Figure 5:
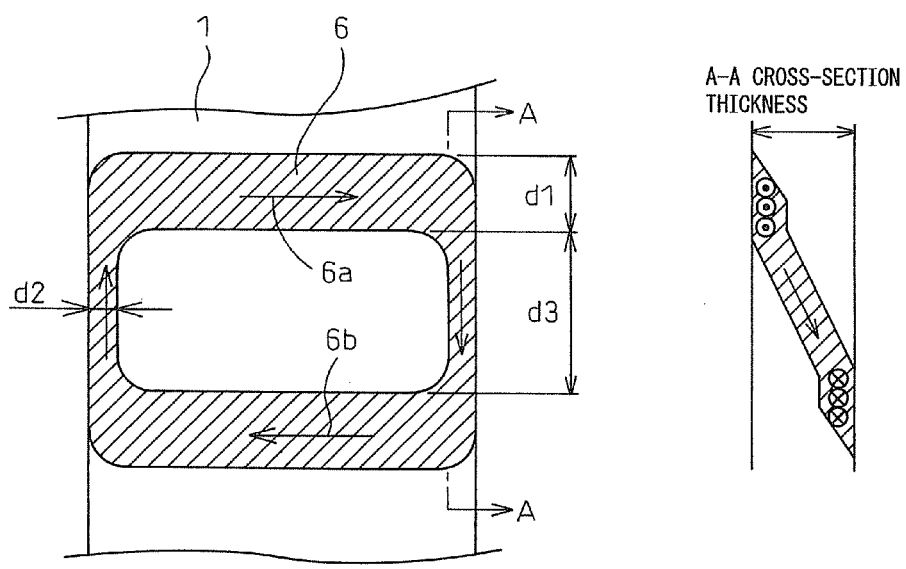
FIG. 5 is a plan schematic view explaining the induction currents generated in a metal plate by the induction heating of FIG. 3.

As the conductors 2a and 2b of the induction coil 2 are arranged with a distance (offset) in the direction of progression of the metal plate, the induction currents 6a and 6b generated by the conductors 2a and 2b of the induction coil 2 do not interfere with each other. A ring-shaped current such as shown in FIG. 5 is generated in the metal plate 1 as a whole, whereby the metal plate 1, even if a nonmagnetic material, can be heated.

In this regard, the current running through the ends of the metal plate (the ends of the metal plate in the width direction, same hereinafter) serves to lessen the reactance with the primary current flowing through the connecting conductors 8 connecting the front and back conductors 2a and 2b of the induction coil 2 or the conductive members 7 connecting the front and back conductors 2a and 2b of the induction coil 2 to a power source, so the current path ends up becoming narrower due to being drawn to the ends of the metal plate, the flux generated by the primary current running through the conductive members 7 and connecting conductors 8 ends up concentratedly passing through the shortest distance end of the metal plate, and the ends of the metal plates end up being heated more than the center by a heating time corresponding to the distance d3 (see FIG. 5), therefore the ends of the metal plate are easily overheated.

Further, if there is one section of the induction coil, the flux spreads easily from the induction coil even at the center part of the metal plate, therefore, the current density of the induction current also drops, so the temperature of the center part increases with difficulty, and the temperature deviation between the center part of the metal plate and the ends of the metal plate easily expands.

Therefore, the present invention uses at least two sections of the induction coil and arranges them adjoining each other in the longitudinal direction of the metal plate. That is, as shown in FIG. 6, conductors 2b and 3b of the induction coil are arranged in proximity and a primary current of the same phase is run through them, whereby, due to the coil conductor of the center part, the flux increases two-fold and the current density rises.

Further, the flux generated by the two close conductors 2b, 3b of the induction coil are opposite in direction from the conductors 2a, 3a of the coil arranged with a distance (offset), therefore there is no interference by the flux generated by 2a, 3a nor flux expansion, making concentration in the vicinity of the induction coil conductors 2b, 3b easy as well as temperature rise at the center of the metal plate easy.

Figure 6:
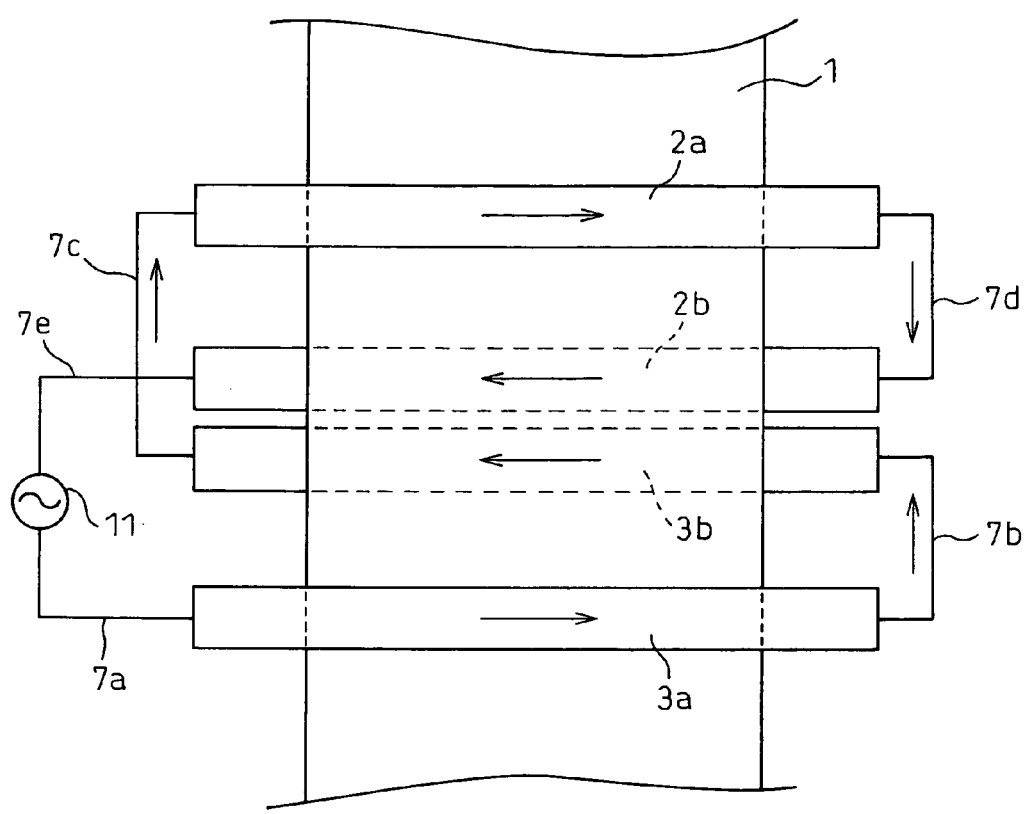
FIG. 6 is a plan schematic view of an example of an induction heating system according to the present invention in which two parallel sections of the induction coil are arranged adjoining each other and conductors at the front and back of the induction coil are arranged with offset to carry out induction heating.

However, at the outer sides of the conductors 2a, 3a of the induction coil (the end sides of the metal plate in the longitudinal direction of the metal plate, that is, in FIG. 6, the upper side of 2a and the lower side of 3a), there is no competing flux and so flux tries to spread to the outer sides of the induction coil, so it is difficult for flux to concentrate, the density of the induction current generated in the metal plate also has difficulty in rising, and the amount of temperature rise is smaller in comparison to the neighboring induction coil conductor.

Therefore, when, as shown in FIG. 6, arranging an induction coil formed by conductors nearly horizontal to the width direction, that is, not having parts slanting to the width direction, parallel to the longitudinal direction of the metal plate, the more the adjoining sections of the induction coil (number of conductors), the easier it is to raise the temperature of the center part of the metal plate, thereby eliminating the temperature deviation with the ends of the metal plate.

Figure 7:
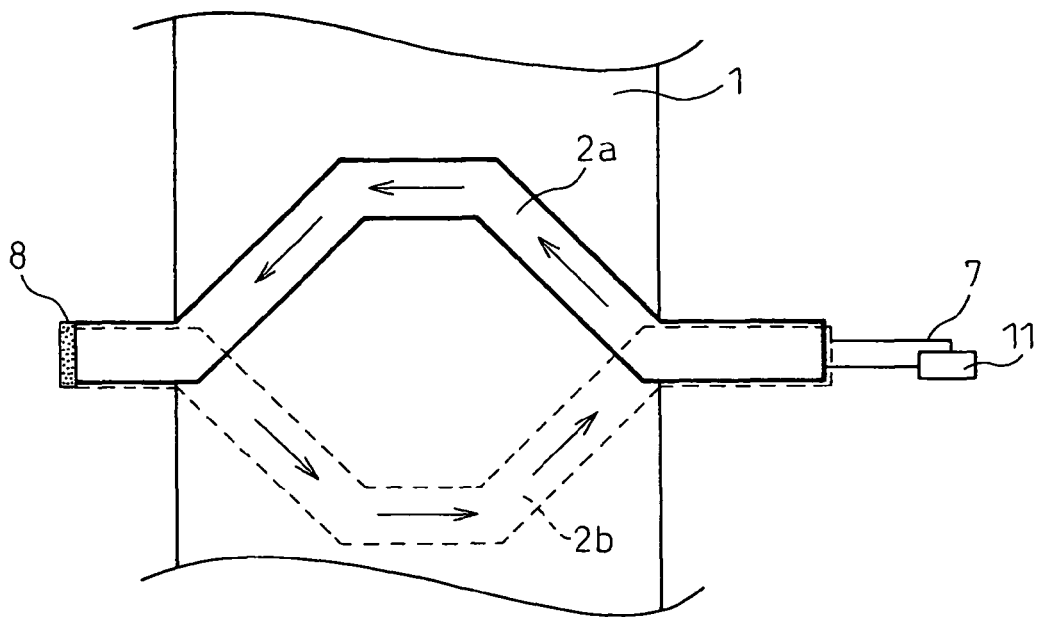
FIG. 7 is a plan schematic view explaining an example of an induction heating system in which conductors at the front and back of the induction coil are offset at the center and conductors of the induction coil are made to slant near the ends of the metal plate.

However, as explained in FIG. 3 to FIG. 5, when arranging an induction coil parallel in the longitudinal direction with offset, overheating of the ends of the metal plate due to currents running through the ends of the metal plate is not eliminated, therefore, to further eliminate the temperature deviation of the heated metal plate, in the present invention, as shown in FIG. 7, at least one of the front and back (front side and back side) conductors of the induction coil is made a shape having a part traversing the metal plate at a slant from the width direction toward at least one of the ends of the metal plate in the width direction.

The range of the width direction of the slanted part of the conductor is not particularly limited, however, the conductor is made to have a slanted part in the vicinity of at least one of the width direction ends of the metal plate in the width direction.

FIG. 7 shows an example where the front and back conductors of the induction coil both have parts slanting in the width direction near the two ends of the metal plate (an example of one section of the induction coil). If making the induction coil such a shape, a ring-shaped induction current path 6 as shown by the bold lines of FIG. 8 is formed in the metal plate 1 and induction currents moving in the direction of the arrows are generated.

This is because it is more difficult for the current path to become narrower at the ends of the metal plate in comparison to FIG. 5 explained earlier, therefore it is difficult for the current density to become high, further, the front and back conductors of the induction coil cross near the ends of the metal plate, therefore the heating time by the induction currents flowing through the ends of the metal plate can be made shorter, and overheating of the ends of the metal plate can be avoided even compared with when the front and back conductors of the induction coil are offset in parallel in the longitudinal direction as shown in FIG. 3.

Figure 8:
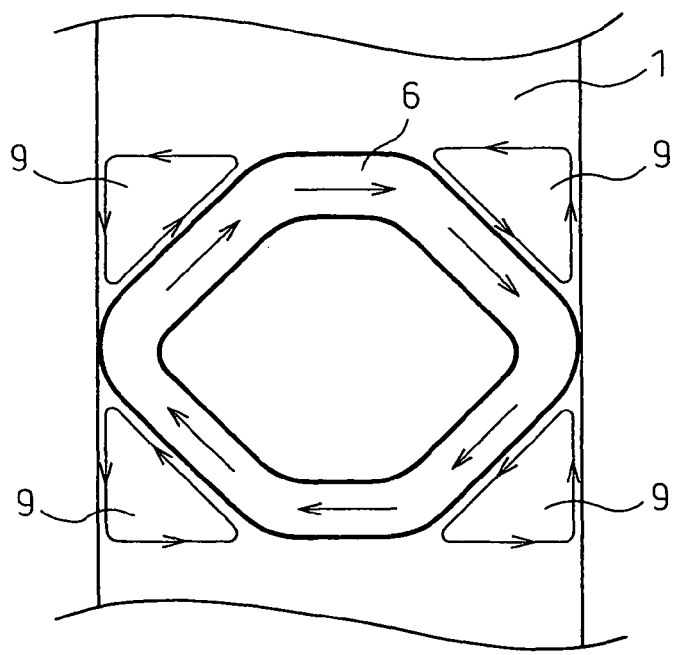
FIG. 8 is a plan schematic view showing the state of the induction currents generated at a metal plate with the coil arrangement of FIG. 7.

In this regard, it became clear from testing and analysis that a master induction current, as shown in FIG. 8, has substantially the same shape as the vertical projection of the front surface side and back surface side conductors and passes inside the part enclosed by the bold lines in the opposite direction to the direction of the induction currents flowing through the front surface side and back surface side conductors, while partial slave induction currents invert at the ends of the metal plate, whereby minor loops of induction currents are generated at the outer side regions of the conductors arranged so as to have a slant with respect to the width direction of the metal plane such as shown in 9 of FIG. 8.

Therefore, when heating requiring strict management of temperature deviation is required, the currents of this minor loop 9 sometimes can no longer be ignored. Sometimes, the currents running at the ends of the metal plate lead to the temperature rising at the ends of the metal plate and therefore overheating problems.

Figure 11:
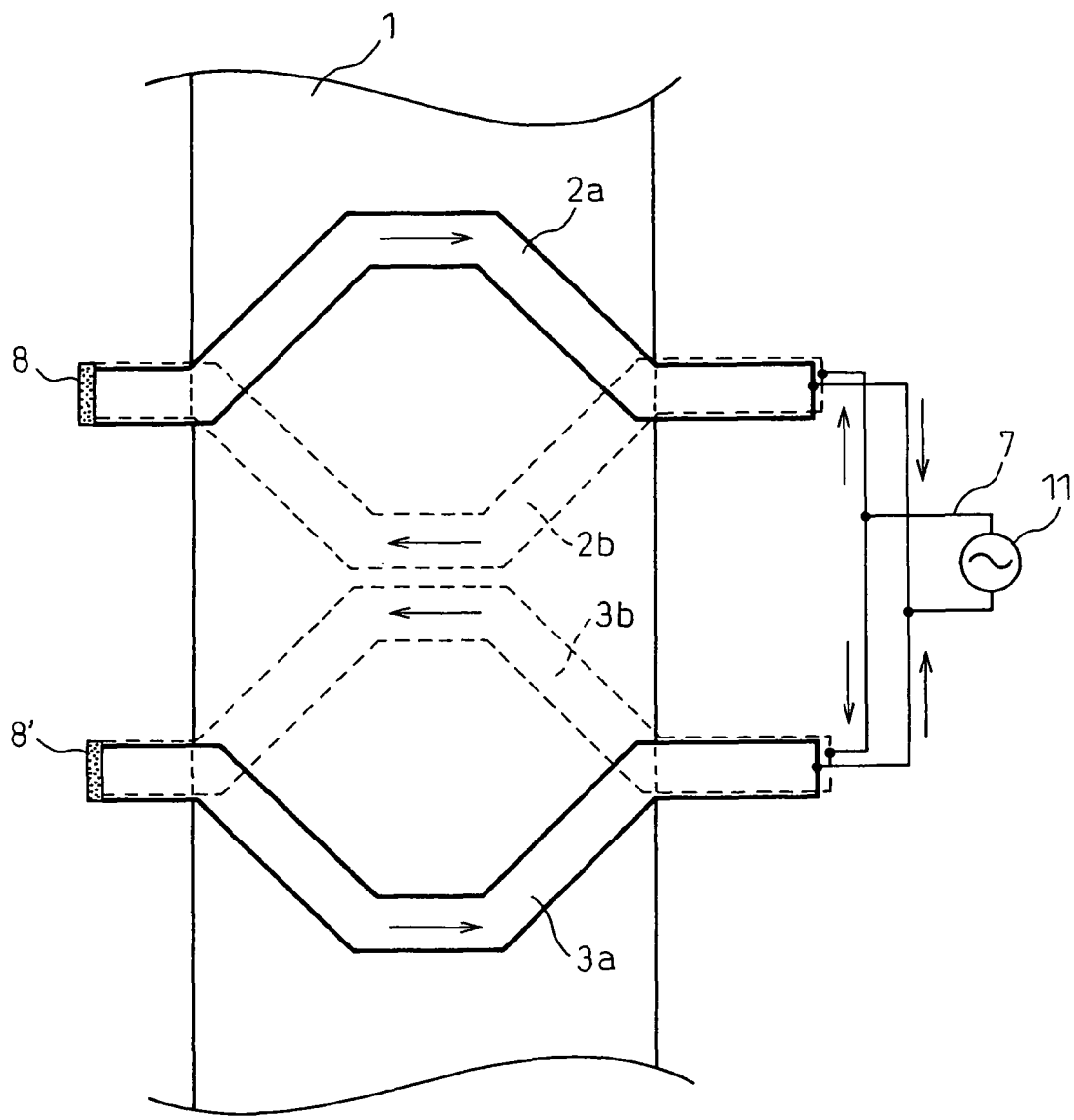
FIG. 11 is a plan schematic view showing an example of an induction heating system of the present invention in which two sections of the induction coil of FIG. 7 are arranged adjoining each other and connected in parallel.

Therefore, in the present invention, as shown in FIG. 11 and FIG. 9(a), two or more sections of the induction coil provided with conductors having parts slanted in the width direction are used adjoining each other. FIG. 9(a) is an example of two sections of the induction coil having front surface side conductors and back surface side conductors arranged with offsets (at distances) in the longitudinal direction of the metal plate 1, that is, one section of the induction coil having the conductors 2a and 2b and another section of the induction coil having the conductors 3a and 3b, arranged adjoining each other in series in the longitudinal direction of the metal plate 1.

Further, in the present invention, the adjoining front surface side conductors of the induction coil are arranged in proximity in the longitudinal direction of the metal plate, while the back surface side conductors are separated from each other more, that is, are arranged to have a distance in the longitudinal direction of the metal plate larger than the distance between the front surface side conductors in proximity.

Alternatively, the back surface side conductors are arranged in proximity in the longitudinal direction of the metal plate, while the front surface side conductors are separated from each other more, that is, arranged to have a distance in the longitudinal direction of the metal plate larger than the distance between the back surface side conductors in proximity. Further, when running alternating current in the induction coil, primary currents are passed so as to run in the same direction and the same phase in the proximate conductors.

Figure 9B:
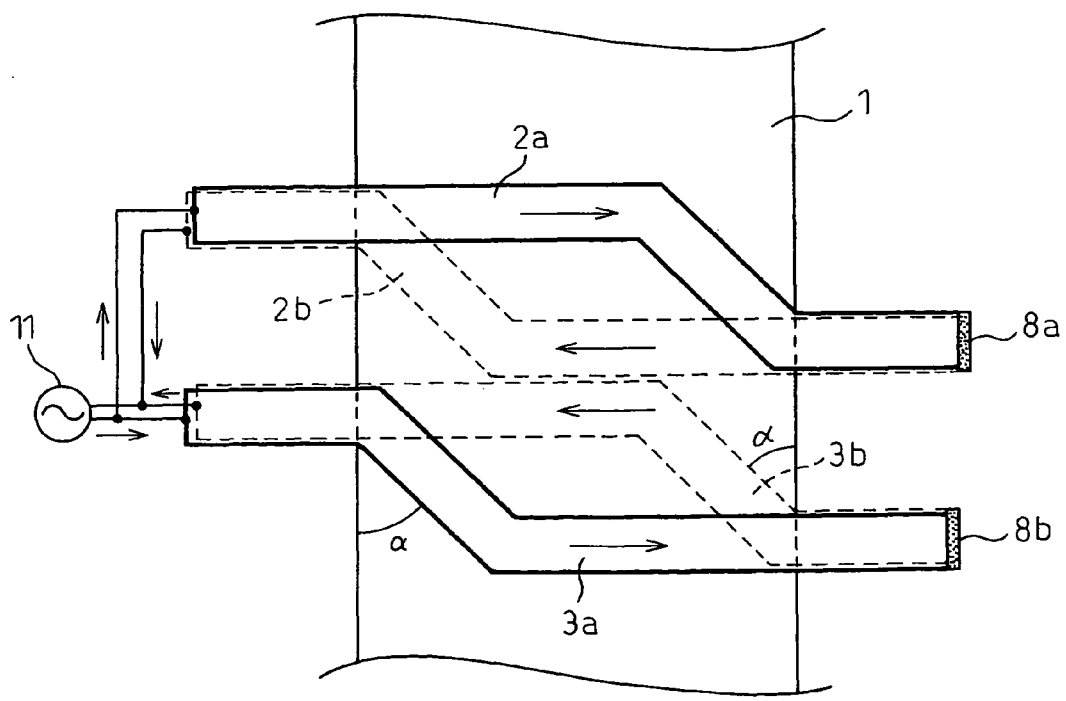

FIG. 9(a) and FIG. 9(b) show examples of conductors of an induction coil at the front surface side and back surface side having slants at the opposite end sides of the metal plate (have slanted parts).

FIG. 9(a) is an example of proximate back surface side conductors. The route over which the primary current runs in the induction coil consists the high frequency power source 11 through the connected conductor 7a and over the path of the conductor 3a→connecting conductor 7b→conductor 2b→end connecting conductor 8→conductor 2a→connecting conductor 7c→conductor 3b→connecting conductor 7d→high frequency power source 11. At the proximate back surface side conductors 2b and 3b, the primary current of the same phase runs in the same direction.

The reasons why two sections of the induction coil provided with conductors having slanted parts are arranged adjoining each other and primary currents of the same phase are run through proximate back surface side conductors (or front surface side conductors) are as follows.

The first reason is that, as explained before, the flux generated by the induction coil can be concentrated, so the heating efficiency rises.

The second reason is that, as explained previously, in the case of conductors having slanted parts, minor loops 9 as shown in FIG. 8 are formed. Due to this, the temperature at the ends of the metal plate rises easier. As opposed to this, in the case or FIG. 11 or FIG. 9(a) in which two sections of the induction coil are arranged adjoining each other, the back surface side conductors (or front surface side conductors) are arranged in proximity, and primary currents of the same phase are run, as shown in FIG. 10, at the outer side regions of the conductors arranged so as to have slants with respect to the width direction of the metal plate (regions of the outer sides of the slanted parts) and the regions sandwiched between the adjoining sections of the induction coil, the directions of the induction currents of the minor loop 10a of the slave induction currents generated by one of the adjoining sections of the induction coil (the 3b side in FIG. 9(a)) and the minor loop 10b of the slave induction current generated by the other (2b side in FIG. 9(b)) can be made to be generated in the opposite directions, so the minor loops can be cancelled out, the slave induction currents running in the minor loops 10 can be reduced, the temperature rise at the ends of the metal plate can be suppressed, and the heating temperature distribution can be made uniform.

Unlike in FIG. 9(a) where one section of the induction coil made up of conductors 2a and 2b and another section of the induction coil made up of conductors 3a and 3b, that is, a total of two sections, are connected in series, FIG. 9(b) is an example where they are connected in parallel. The same effects as explained above can be obtained even with parallel connection.

FIG. 11 is an example where two sections of the induction coil, where each of the conductors making up the induction coil is provided with a conductor having a slanted part at both the front and back near the two ends of the metal plate 1, are arranged adjoining each other and the back surface side conductors 2b and 3b are arranged in proximity and connected in parallel with the power source 11 so that primary currents of the same phase run in the conductors 2b, 3b.

At the ends of the metal plate 1 surrounded by the conductors 2b and 3b, the induction currents generated at the conductors 2b and 3b are opposite in direction but nearly the same size, so at the outer side regions of the conductors 2b, 3b arranged so as to have slants with respect to the width direction of the metal plate and the regions sandwiched between the adjoining sections of the induction coil, induction currents stop running almost entirely, and the occurrence of minor loops can be suppressed.

As is clear from the above principle, the adjoining sections of the induction coil are not limited to two sections. The more the number, the more the effects of the slave induction currents (minor loops) running at the ends of the metal plate can be minimized.

Figure 12:
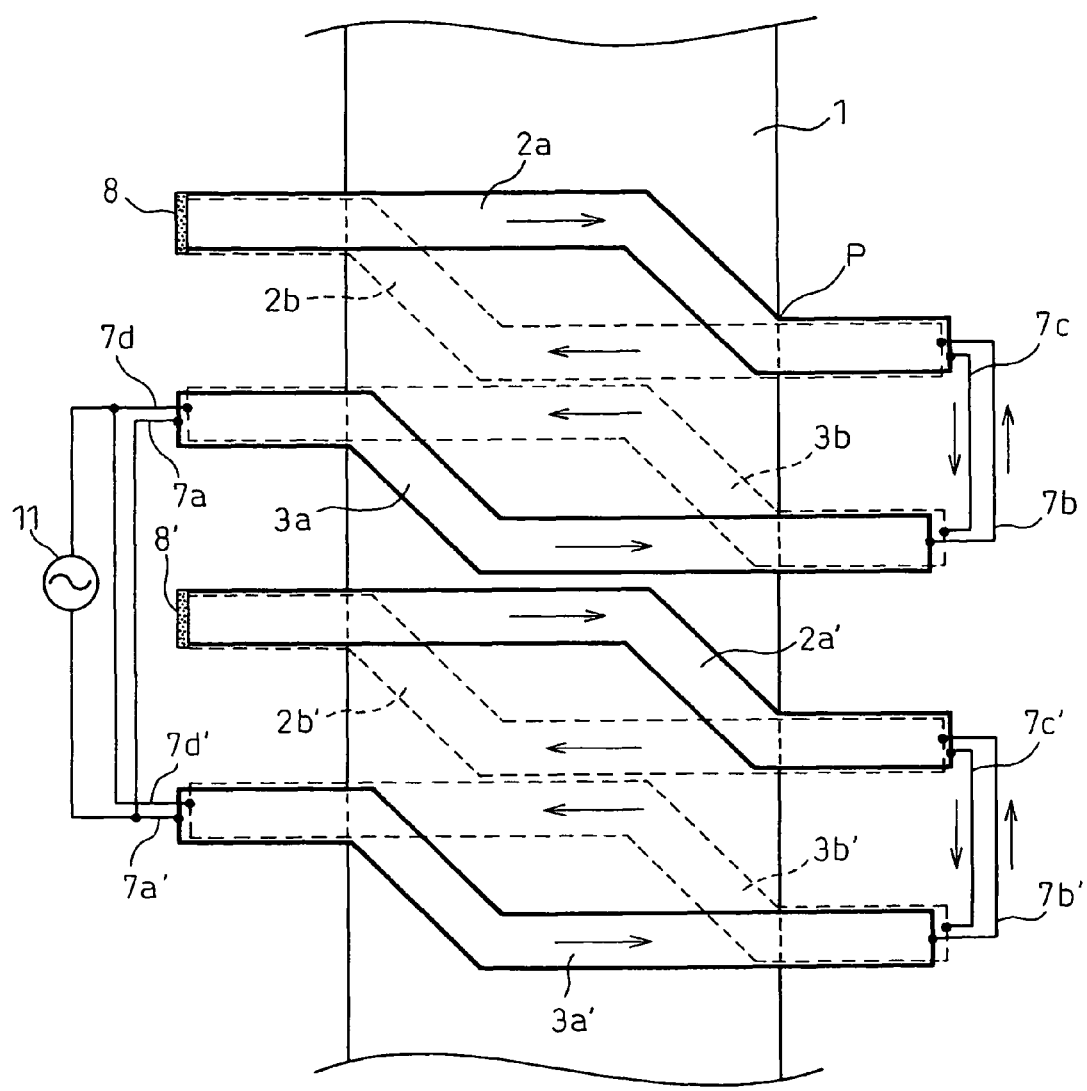
FIG. 12 is a plan schematic view of an induction heating system of the present invention in which two sections of the induction coil of 2T of FIG. 9$a$ are arranged adjoining each other and connected in parallel.

The connection of these adjoining sections of the induction coil may be a series connection as in FIG. 9(a) or a parallel connection as in FIG. 9(b) and FIG. 11 or a combination of parallel and series connections as in FIG. 12.

Note that, FIG. 12 is an example in which four sections of the induction coils are arranged. At the regions of both ends of the metal plate sandwiched between the conductors 2b, 3b, both ends of the metal plate sandwiched between the conductors 3a, 2a', and both ends of the metal plate sandwiched between the conductors 2b', 3b', induction currents stop running almost entirely, so the occurrence of minor loops can be suppressed.

At the adjoining sections of the induction coil, the distances in the longitudinal direction of the metal plate between the proximate back surface side conductors (or front surface side conductors) are not particularly stipulated, however, if the distances are too large, the effect of flux concentration weakens. They are preferably not that separated from each other. The distance is preferably no more than one width of the conductor in the longitudinal direction of the metal plate.

Further, the angle of the slanting conductors may be determined by finding the appropriate angle α from the width of the heated metal plate and the width of the induction coil by electromagnetic field analysis and testing. Further, the sections of the induction coil combined are if possible the same in width and shape. The temperature distribution is easy to control in that case. However, they need not be the same shape. So long as following the above principle, there is no problem even if different shapes.

However, even in FIG. 9(a), FIG. 9(b), FIG. 11, and FIG. 12, minor induction currents generated at the outer sides of the slanted parts of the conductors having slants arranged at the outermost sides in the metal plate 1 where currents of the same phase do not run (the frontmost side or backmost side of the longitudinal direction of the metal plate, the uppermost part or lowermost part in the drawings) (minor loops generated at the outer sides of the slanted parts of the conductors at the outermost edges in the longitudinal direction (the uppermost and lowermost part of the drawings)) remain as they are.

Figure 13:
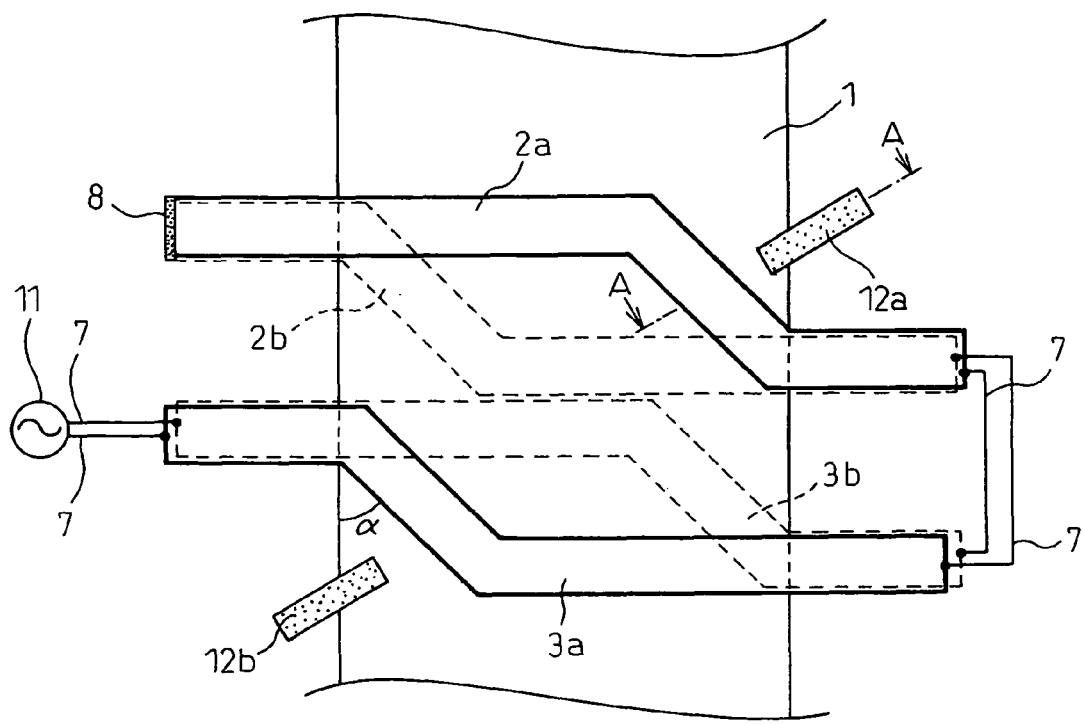
FIG. 13 is a plan schematic view explaining an example of arrangement of a magnetic core in an induction heating system according to the present invention of FIG. 9($a$).

Therefore, in the present invention, to reduce the minor induction currents of the slanted parts, magnetic cores 12a, 12b extending from the front surface side to the back surface side of the metal plate so as to cover the ends of the metal plate are arranged at the ends of the metal plate 1 at the outer sides of the slanted parts of the conductors having the slants arranged at the outermost sides in the metal plate 1 as shown in FIG. 13 (the outer sides of the conductors 2a and 3a where there are no proximate conductors). As the shapes covering the ends of the metal plate, for example, the magnetic cores may be given U-shaped cross-sections.

Figure 14:
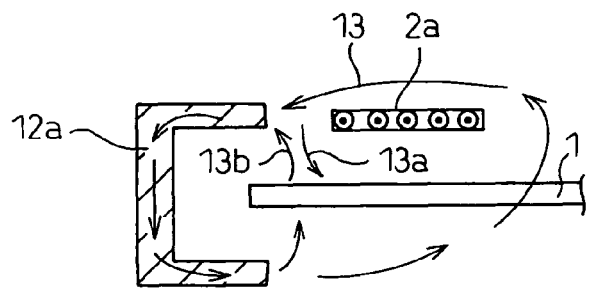
FIG. 14 is a cross-sectional schematic view explaining the workings of a magnetic core.
Figure 15:
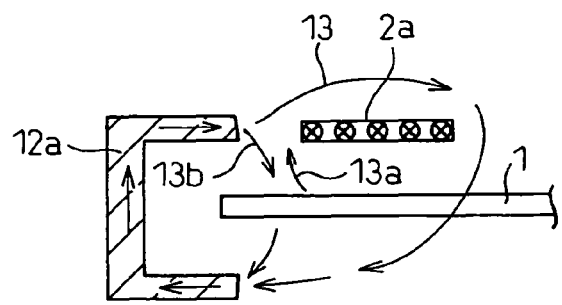
FIG. 15 is a cross-sectional schematic view explaining the workings of a magnetic core when the reverse phase of FIG. 14.

FIG. 14 and FIG. 15 are cross-sectional schematic views explaining the workings of the magnetic core 12a at the A-A cross-section of FIG. 13.

In FIG. 14, the flux 13 is generated according to the right-hand screw rule around the coil conductor 2a by the primary current running in the coil conductor 2a (in the drawing, a case where it runs from the back of the paper to the front), however, a part of the flux enters the magnetic core 12a having a high magnetic permeability and low magnetic resistance in comparison to the surroundings at the front surface side of the metal plate 1, passes from the top through the inside, reaches the lower part, then heads from the back surface of the metal plate 1 toward the end of the metal plate 1, passes through the metal plate 1, and returns to the upper part of the magnetic core 12a as the flux 13b.

On the other hand, most of the remaining flux 13 passes through the flux 13a at the end of the metal plate 1, but it is obstructed by the flux 13b of the opposite direction and enters displaced to the center side of the metal plate 1. Therefore, the minor induction currents circling at the end of the metal plate 1 due to the flux 13a are cancelled by the induction current generated by the flux 13b of the reverse phase, whereby the minor induction currents running in the ends of the metal plate are reduced, thereby allowing overheating of the ends of the metal plate to be suppressed.

FIG. 15 is an explanation of the case where a current of a phase opposite that of FIG. 14 runs in the conductor 2a. In this case also, induction currents 13a and 13b of the reverse phase are generated at the end of the metal plate 1 and cancel each other out, whereby minor loops are reduced and overheating is suppressed.

Figure 16:
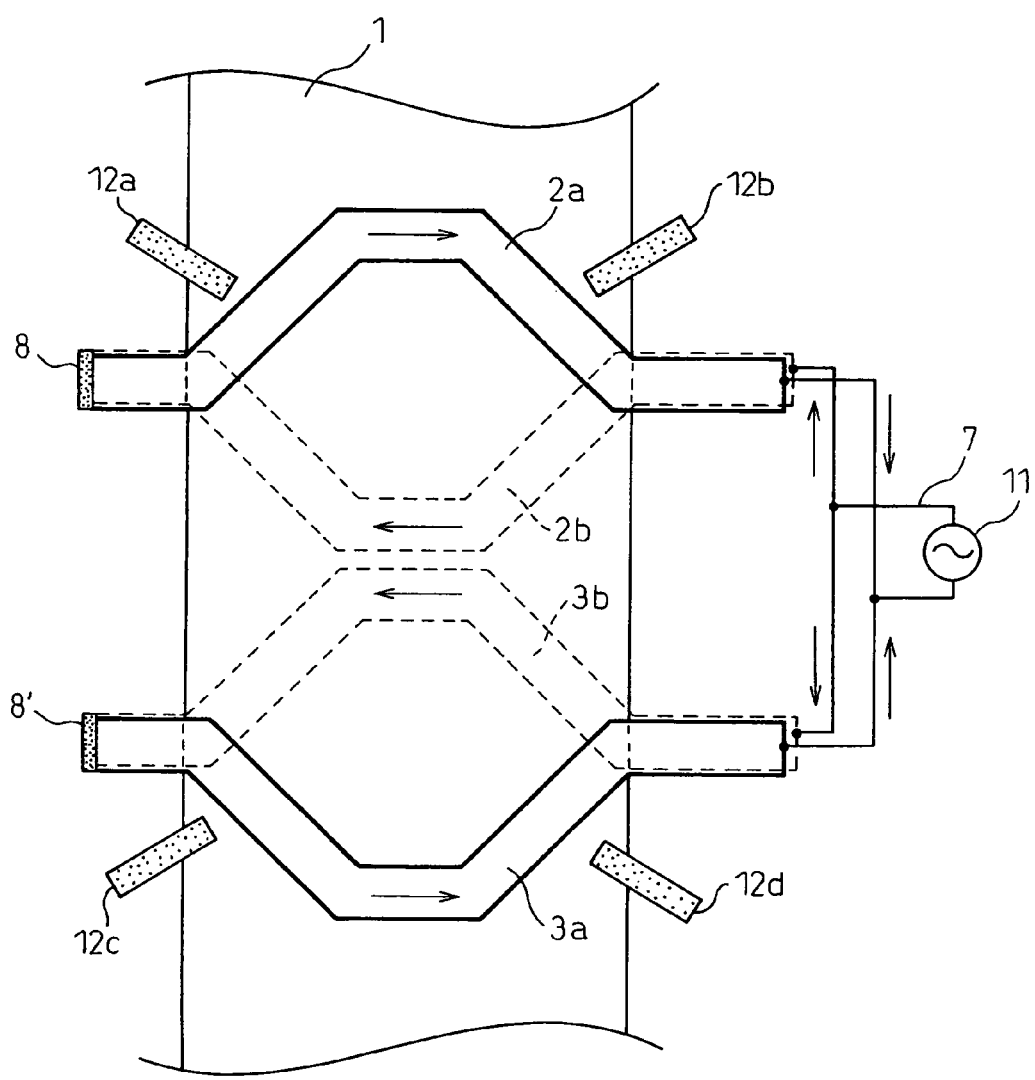
FIG. 16 is a plan schematic view explaining an example of provision of a magnetic core in the induction heating system of FIG. 11.

FIG. 16 is an example of magnetic cores being added to the outer sides of the slanted parts of the conductors of the induction coil arranged at the outermost sides in the arrangement of the induction coil shown in FIG. 11. This suppresses overheating of the ends of the metal plate caused by the minor induction currents at the outer sides of the four slanted parts of the conductors having slants arranged at the outermost sides.

Figure 17:
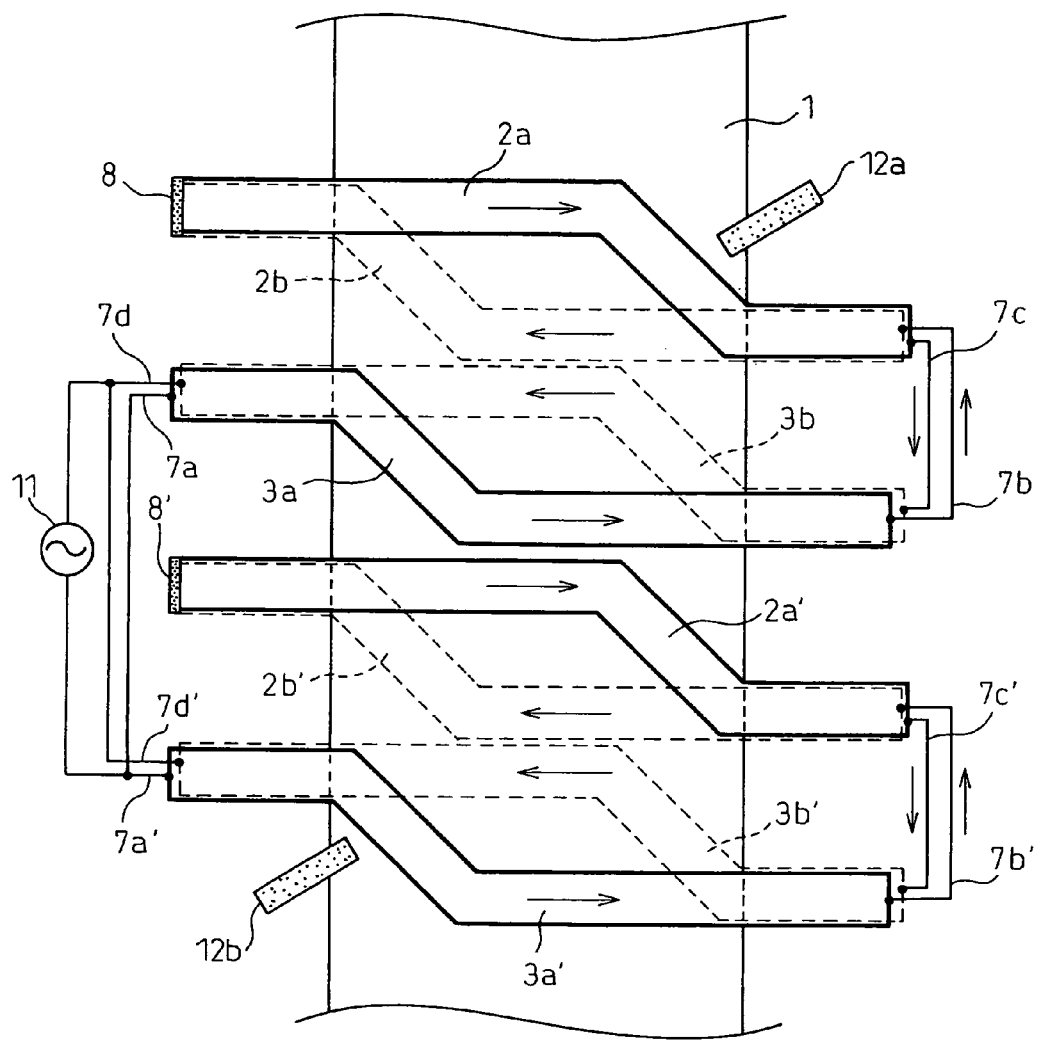
FIG. 17 is a plan schematic view explaining an example of provision of a magnetic core in the induction heating system of FIG. 12.

FIG. 17 is an example, in the arrangement of the induction coil shown in FIG. 12, where four sections of the induction coil are arranged in proximity so that currents of the same phase run and magnetic cores are arranged at the outer sides of the slanted parts of the conductors having slants arranged at the outermost sides in the metal plate 1 where minor loops cannot be cancelled out. This enables extremely effective temperature control at the ends.

The magnetic cores used may be suitably selected from laminated magnetic steel plates or ferrite, amorphous materials, or other materials having a high relative magnetic permeability and low heat generation.

Further, in the explanation, the magnetic cores are explained with reference to an example where they are arranged so as to face the slanted parts of the conductors vertically from the ends of the metal plate and thereby cover the metal plate, however, they may also be arranged so as to vertically head from the ends of the metal plate to the end faces of the metal plate to cover the metal plate. The angle need not necessarily be precise.

Next, the method of controlling the heating temperature distribution of the metal plate by the induction heating method of the present invention will be explained.

Figure 18A:
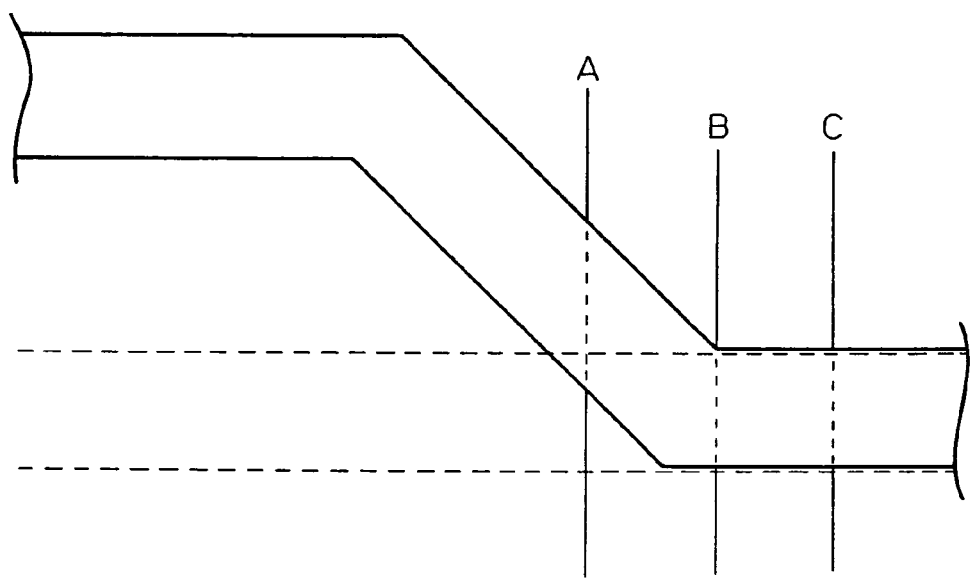
FIG. 18($a$) is a plan schematic view showing the relationship between an induction coil having a slanted conductor part and the position through which an end of a metal plate passes.

FIG. 18(a) is a schematic view taking out a conductor making up a slanted part of the induction coil and an end part of the metal plate and showing the positional relation of the end of the metal plate and the conductor. The A line in the drawing shows a case where the end of the metal plate passes the middle of the slanting conductor, the B line a case where the end of the metal plate passes near where the slanting conductor overlaps with the back surface conductor and once again begins to extend to the outer side of the end of the metal plate vertical to the metal plate, and the C line a case where the end of the metal plate passes through the middle where the slanting front surface side conductor overlaps with the back surface conductor at the inner side of the end of the metal plate and the front and back conductors completely overlap and extend to the outer side of the end of the metal plate vertical to the metal plate.

Figure 18B:
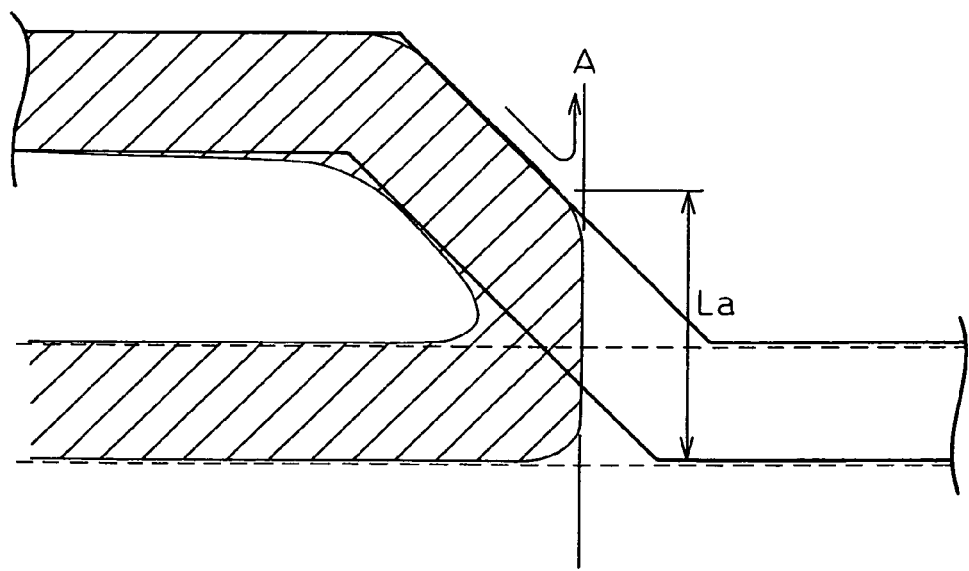

FIG. 18(b) is a schematic view showing the induction current generated in the metal plate when the end of the metal plate passes the A line. The hatched part in the drawing indicates the range where the master current generated by the induction coil runs, while the arrows indicate the slave induction currents forming the minor loops.

When the end of the metal plate passes through the middle of the slant of a slanting conductor of the induction coil, the end of the metal plate is run through by an induction current over approximately the La distance. Further, originally, the induction current should flow along the slanted induction coil, but the current path ends past the end of the metal plate, so the induction current runs along the end of the metal plate, whereby the density of the induction current running at the end of the metal plate becomes higher and it becomes easier for the temperature of the end of the metal plate to rise.

Figure 18C:
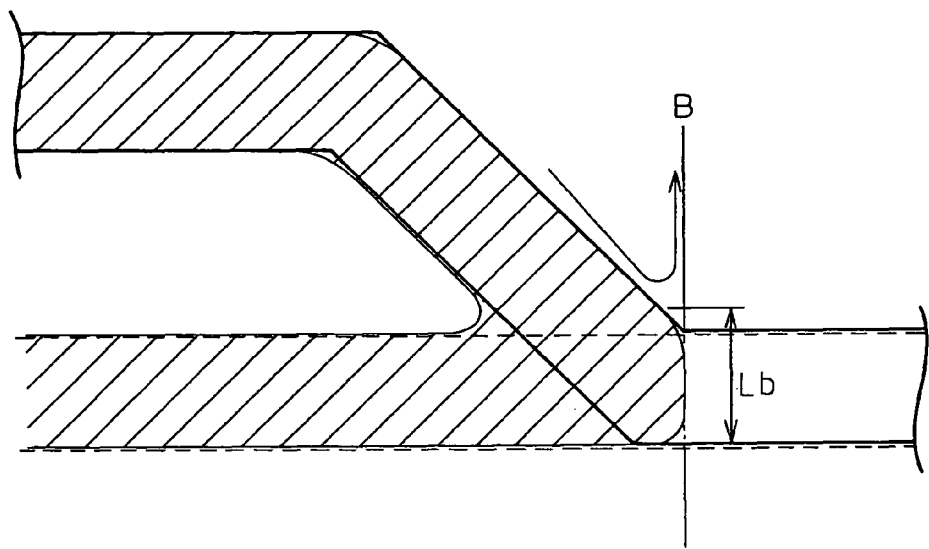

As shown in FIG. 18(c), when the end of the metal plate passes the B line near where the end of the slant of the slanting conductor ends and where the front and back conductors overlap, the induction currents run over the Lb distance shorter than the above La, however, the front and back conductors partially overlap at the end of the metal plate, so the generation of induction current is suppressed at the end of the metal plate and, therefore, it becomes more difficult for the end temperature to rise.

That is, in the present invention, the slanting conductors of the induction coil head toward the ends of the metal plate, and the front and back conductors of the induction coil are arranged so that they overlap at the outer sides of the ends of the metal plate, however, if the front and back conductors of the induction coil are arranged so as to overlap, this part has the same flux distribution as the so-called LF heating, the induction currents are not generated as in the above in the metal plate and the master current runs inside from the ends of the metal plate, whereby the amount of temperature rise of the ends of the metal plate decreases.

Figure 18D:
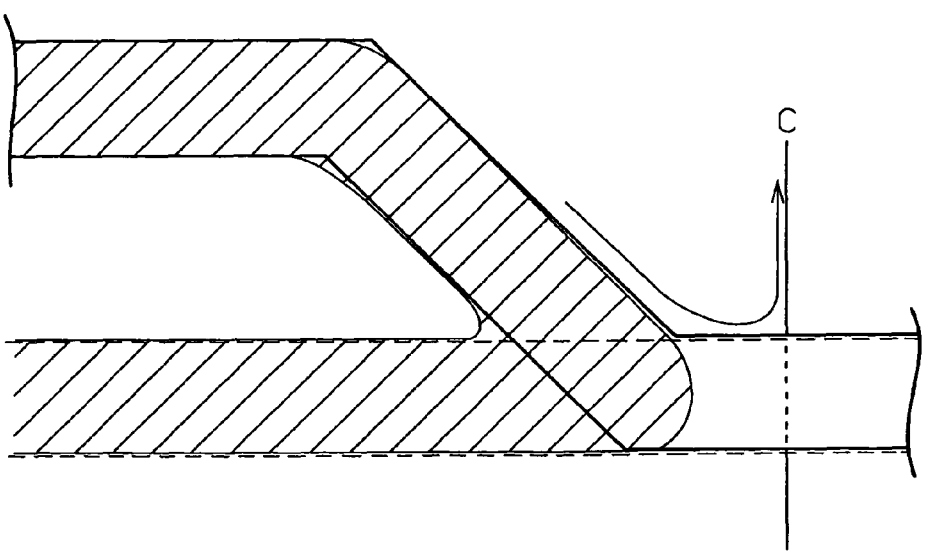

Further, when an end of the metal plate passes the line of C as in FIG. 18(d), it completely passes the position where the front and back conductors of the induction coil overlap, so induction currents are not generated at the end of the metal plate, and the main current of the induction current runs at the place where it entered from the end of the metal plate.

Therefore, the temperature of the ends of the metal plate is lower than that of the center part. FIG. 18(a) shows a state where the front and back conductors of the induction coil overlap almost entirely, however, even if the front and back conductors of the induction coil do not completely overlap near the ends of the metal plate, as long as there is no offset of one width of the induction coil or greater, induction currents generated at the ends of the metal plate can almost entirely be suppressed.

As explained above, if the heating method of the present invention is used, by adjusting the relative positions of the slanting conductors with respect to the metal plate, the heating temperature distribution of the metal plate can be controlled.

Figure 19:
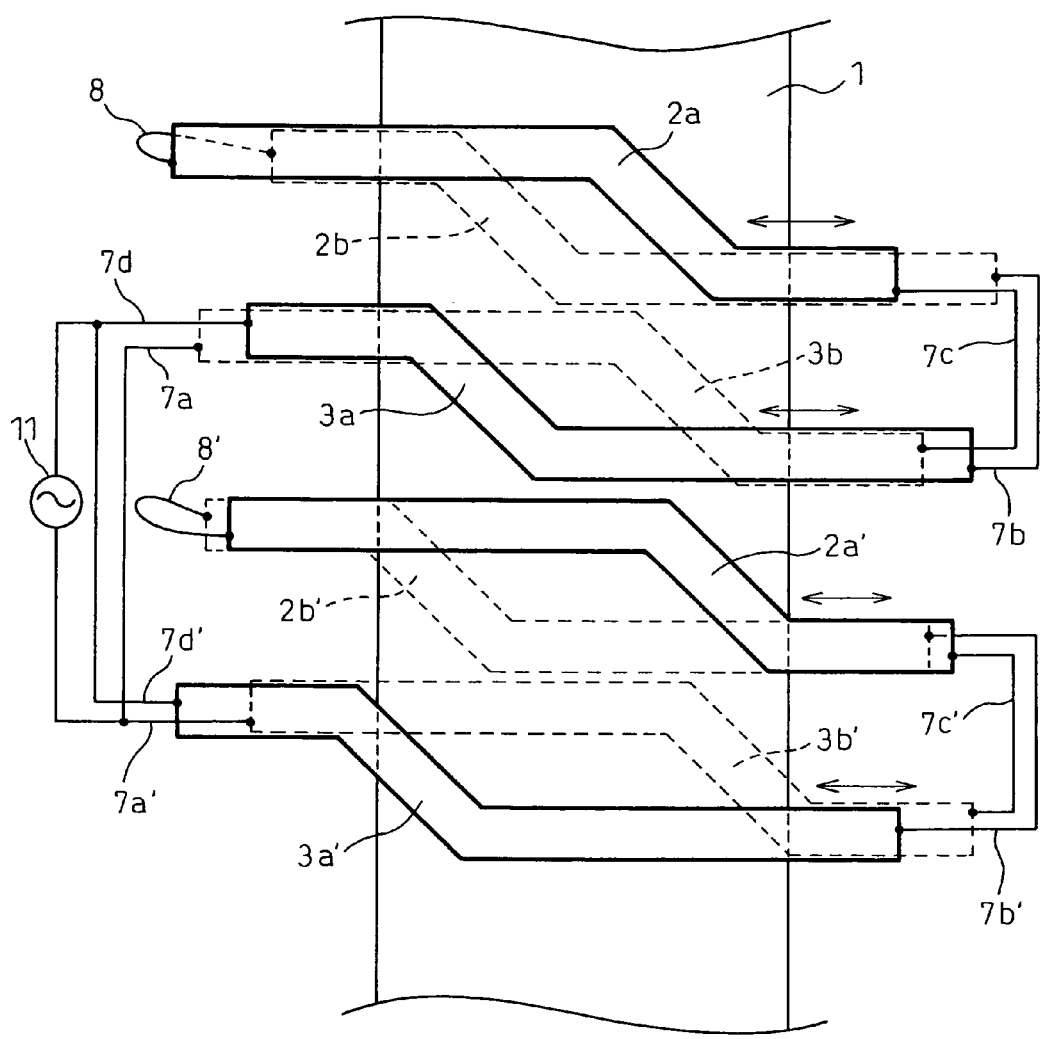
FIG. 19 is a plan schematic view showing an example where the positional relationship between the slanted part of each section of the induction coil of FIG. 12 and the end of a metal plate is different.

Further, as shown in FIG. 19, by using a plurality of sections of the induction coil (four sections in the drawing) and by separately adjusting the positional relationships of the slanted part of the conductors of the induction coils with the ends of the metal plate, the heating temperature distribution can be finely controlled.

FIG. 19 shows an example where a set of induction coil conductors 2a, 2b, 3a, and 3b connected in series for 2T (turns) and a set of induction coil conductors 2a', 2b', 3a', and 3b' connected in series for 2T are connected in parallel, but the positional relationships of the pair of induction coil conductors 2a, 2b, the pair of 3a, 3b, the pair of 2a', 2b', and the pair of 3a', 3b' with the ends of the metal plate are changed for each induction coil conductor, and the position where the slanted part of an induction coil conductor ends (the position horizontal from the slant) gradually moves from the inside of the metal plate to the outside toward the ends of the metal plate the more from the upper induction coil section to the lower induction coil section in the figure.

In this case, the lower the arrangement of the induction coil section, the greater the function of promoting the heating of the ends of the metal plate. If combining separate positional control of the induction coil sections in such a way, the heating temperature distribution can be freely controlled to make the temperature of the ends of the metal plate higher, lower, or equal to that of the center part of the metal plate. Further, the temperature distribution of a specific area can also be controlled.

Further, if making each induction coil set freely movable in the width direction, it is possible to track any snaking of the metal plate or change of the width of the metal plate, thereby making handling of fluctuations in operation easy.

By laying out the above sets of the induction coil on a cart able to move in the width direction of the metal plate and making the cart move in the width direction, the relationship between the positions of the slanted parts of the conductors of the induction coil and the positions of the ends of the metal plate can be adjusted.

Note that, when necessary, by laying out a plurality of sets of the induction coil on this cart and making it move in the width direction, the relationship between the positions of the slanted parts of the conductors of the induction coil and the positions of the ends of the metal plate can be widely adjusted.

Further, in each set of the induction coil, by connecting the front surface side conductor and back surface side conductor so that both may move in the width direction or one with respect to the other at the outer sides of the slanted parts (nonslanted parts), the relationship of the positions of the slanted parts of the conductors of the induction coil and the positions of the ends of the metal plate can be adjusted at each set as well.

Further, the induction heating system according to the present invention is able to control the heating temperature distribution by the magnetic cores as well. That is, when the effects of the minor induction currents of the slanted parts of the induction coil at the entrance side and exit side of the metal plate 1 are large, as shown in FIG. 20, it is sufficient to suppress the currents running through the ends of the metal plate by changing the supplementary amount of flux generated at the coil conductor 3h by the magnetic core 12b or change the location and density of returning the supplemented flux.

Figure 20:
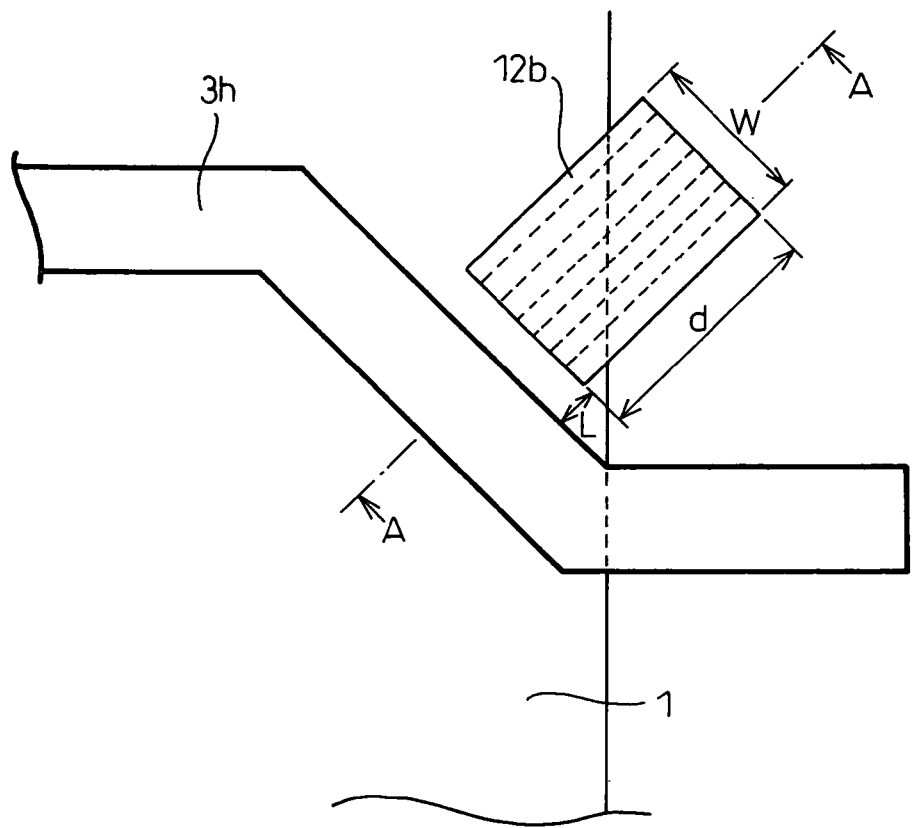
FIG. 20 is a cross-sectional schematic view explaining the workings of heating temperature control by a magnetic core.

FIG. 20 is a partial plan schematic view in which an induction coil 3h having a slanted part is arranged on the metal plate 1 and explaining in what manner the magnetic core 12b is arranged. In order to change the amount of flux to be supplemented by the magnetic core 12b, the method of changing the area (width and thickness of the magnetic core) of the cross-section of the magnetic core 12b where the flux enters, changing the distance between the magnetic core 12b and the coil conductor 3h of the induction coil (L in FIG. 20), changing the area by which the metal plate 1 at the outer side of the coil conductor 3h is covered by the magnetic core 12b (proportional to the product of d and w in FIG. 20), and the like, the amount of flux entering the inside of the magnetic core 12b can be changed.

Further, as the method of controlling the heating temperature distribution according to the way the flux which entered the inside of the magnetic core 12b is returned to the metal plate, by increasing/decreasing the area of the magnetic core 12b at the side opposite to the induction coil (proportional to the product of d and w in FIG. 20: d and w on the front surface and the back surface not necessarily required to be the same), changing the position of the magnetic core 12b from the end of the metal plate (L of FIG. 20), or changing the distance between the magnetic core 12b and the metal plate 1 etc. so as to control the size of the induction current in the opposite direction generated by the flux returning by the magnetic core 12b, the heating distribution at the end of the metal plate can be changed.

Figure 21:
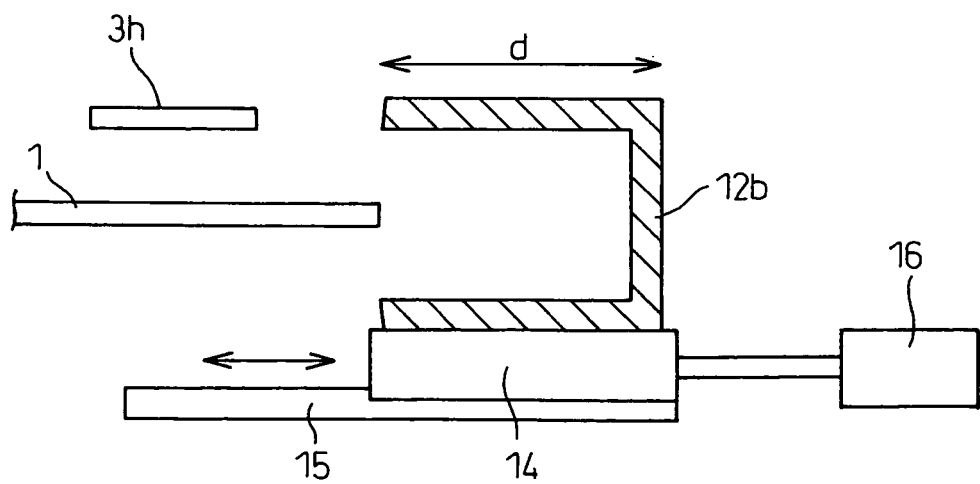
FIG. 21 is a cross-sectional schematic view explaining an example of a mechanism controlling the heating temperature by the magnetic core.

FIG. 21 shows an example of continuously controlling the horizontal distance of the magnetic core 12b from the end of the metal plate (L of FIG. 20). If loading the magnetic core 12b on a table 14 set on a rail 15 and making the table 14 move by an air cylinder or electric cylinder or other such drive system 16, the magnetic core 12b can move freely and the area by which the magnetic core 12b covers the metal plate 1 can be freely controlled.

Accordingly, if providing a temperature measurement device after the induction heating system and then performing the induction heating, control to the desired temperature distribution becomes possible. That is, if the temperature distribution of an end of the metal plate after heating is high, it is sufficient to push the magnetic core 12b toward the inside of the metal plate so as to increase the area by which the magnetic core covers the end of the metal plate, while conversely if the temperature at an end of the metal plate is low, it is sufficient to pull the magnetic core 12b in a direction away from the end of the metal plate.

Further, the mechanism of FIG. 21 also serves as a method for arranging the magnetic core 12b at an appropriate position when the metal plate 1 snakes for example. If the movement distance can be made long, setting at an appropriate position when the plate width is changed is possible.

The members for moving the magnetic core 12b are placed in a strong magnetic field, so as much as possible are preferably comprised of strong plastic or ceramic or other nonconductive materials. When forced to use a metal, SUS304 or another nonmagnetic metal must be used and, when liable to heat, a cooling structure is necessary.

When the metal plate snakes, it deviates from the position from the induction coil set in advance and therefore temperature excesses or shortages occur at the two ends of the metal plate. In such a case as well, the desired heating temperature distribution can be obtained by moving the magnetic core 12b to match the snaking of the metal plate 1.

To adjust the temperature in this way, it is effective to set a snaking detection device or monitor device either before or after the induction system to obtain an accurate grasp of the running position of the metal plate and obtain a grasp of the heating temperature distribution and obtain the desired temperature distribution by further providing a device for measuring the temperature distribution at least at the exit side of the present system, if possible also at the entrance side of the present system, and control the position of the magnetic cores so that appropriate heating can be carried out.

As explained above, the present heating system and heating method are capable of effective heating irrespective of the plate thickness and plate width and regardless of the material being magnetic or nonmagnetic. That is, by using electricity, there is almost no thermal inertia in comparison to conventional gas heating methods, therefore operation conditions can be changed freely, heating to the desired temperature can be freely carried out, heating can be carried out at any heating rate at high temperature parts where it is difficult for heat to enter with radiant heating, and there is almost no idling or time required for startup, so the degree of freedom of operation is greatly increased.

Further, changes in plate width and changes in plate thickness can be easily handled, so production plans and production itself can be carried out flexibly with few constraints.

Further, the installation space also can be greatly reduced compared with radiant heating and the construction costs can also be lowered. Further, the frequency of the heating power source used can be made an inexpensive comparatively low frequency of an easily handleable power source. The increase in coil voltage etc. proving a problem in high frequency heating can be easily avoided, and hardware limitations can be greatly eased.

Further, the induction heating system and induction heating method according to the present invention are a superior heating system and heating method of metal plate enabling a single system to handle a wide range of sizes and types of products, enabling control of the heating temperature distribution preventing overheating of the ends of the metal plate, which had been a problem in induction heating systems up until now, and enabling control of the temperature distribution to a precisely targeted temperature distribution and so having features never before seen in the past.

EXAMPLES

Examples I

To confirm the advantageous effects of the present invention, we conducted experiments running and heating a 0.5 mm thick×600 mm wide nonmagnetic steel SUS304.

The power source used was a 10 kHz, max 100 kW high frequency power source. A tuning capacitor for adjusting the resonance frequency was changed in capacity to match the inductance of the induction coil.

The induction coil used was comprised of 150 mm wide, 10 mm thick copper plate to which a 10 mm outside diameter and 8 mm inside diameter water-cooled copper pipe was brazed at the opposite side from the steel plate (outside), that is, was made of water-cooled copper plate. In the present example, "conductor" indicates both the copper plate and copper pipe.

The temperature deviation after heating was compared among Example 1 according to the present invention where the gap between the heated material and the induction coil was set at 100 mm and, as shown in FIG. 6, two sections of the induction coil were arranged adjoining each other in parallel and offset by 150 mm in the longitudinal direction of the metal plate and where primary currents of the same phase were run, Example 2 according to the present invention where four sections of the induction coil (the offset of the induction coil sections in the longitudinal direction of the metal plate made 150 mm) were connected in series for 2T to give an adjoining arrangement and two sections of the same were connected in parallel (not shown), and, as a Comparative Example 1, a case where one section of induction coil was used alone as shown in FIG. 3.

Note that, in Examples 1 and 2, the distance between the conductors in proximity at the back surface side or front surface side in the longitudinal direction of the metal plate was made 20 mm. Heating was carried out while running the heated material attached with K thermocouples at 5 m/min. The thermocouples were mounted at the center part and ends of the heated material.

The results are shown in Table 1. Concerning the temperature deviation ratio in the table, the rising temperature differs for each example, so the highest rise (maximum value of [temperature after heating−temperature before heating]) and the lowest rise (minimum value of [temperature after heating−temperature before heating]) in the temperature distribution in the plate were used to define the temperature deviation ratio, that is, highest rise/lowest rise. This enabled the fluctuations in the rising temperature distribution to be compared by the same scale.

TABLE 1

|  |  | Temperature deviation ratio |
| --- | --- | --- |
| Invention examples | Example 1 | 4.6 |
|  | Example 2 | 2.1 |
| Comparative example | Comparative Example 1 | 12.2 |

In Examples 1 and 2 and Comparative Example 1, the temperature of the center part of the metal plate was low and the temperature of the ends was high. In comparison to Comparative Example 1 where heating was carried out by a single section of the induction coil alone, in Example 1 according to the present invention arranging two sections of the induction coil adjoining each other and running primary currents of the same phase, the temperature deviation diminished to approximately 1/3, whereas in Example 2 arranging four sections of the induction coil in proximity, the temperature deviation was further reduced to approximately 1/6.

Examples II

We conducted experiments on Example 3 according to the present invention arranging two sections of the induction coil having slanted parts made from 150 mm wide water-cooled copper plate as in FIG. 9(a), offsetting them by 200 mm at the front and back surfaces of the steel plate at the center in the direction of progression of the steel plate, and setting the slants of the slanted parts of the sections of the induction coil having the slanted parts to angles α with the metal plate of 20°, Example 4 arranging four sections of the induction coil (offset of sections of the induction coil at front and back surfaces of metal plate at center in direction of progression of metal plate set to 200 mm and angles of slants of slanted parts with ends of metal plate set to 20°) as in FIG. 12 and making the positions P where the slants of the conductors of FIG. 12 end at the ends of the metal plate for heating, and, as a comparative example, Comparative Example 2 heating by one section of the same induction coil (not shown).

Note that, in Examples 3 and 4, the distance between proximate conductors in the longitudinal direction of the metal plate at the back surface side or front surface side was made 15 mm. The positional relationship of the ends of the metal plate and the conductors making up the induction coil was, as shown in FIG. 12, one where the ends of the metal plate pass through the ends of the slanted parts. The evaluation was performed by the rising temperature when running and heating the heated material attached with K thermocouples. The running speed was 5 m/min.

The results are shown in Table 2. The temperature measurement positions are the same positions as Examples I, while the temperature deviation ratio has the same definition as in Examples I.

TABLE 2

|  |  | Temperature deviation ratio | Comment |
| --- | --- | --- | --- |
| Invention examples | Example 3 | 1.3 | Plate center temperature < Plate edge temperature |
|  | Example 4 | 1.1 | Plate center temperature > Plate edge temperature |
| Comparative example | Comparative Example 2 | 1.9 | Plate center temperature < Plate edge temperature |

When heating with slanted parts, the temperature deviation can be reduced even alone. In the case of Comparative Example 2, it was 1.9. However, by using two sections of the induction coil, the temperature deviation was further reduced down to 1.3.

Further, when using four sections of the induction coil, the temperature deviation was reduced down to 1.1, and the temperature at the end sides was lower than the temperature at the center part of the metal plate.

Examples III

We conducted experiments using four sections of the induction coil tested in Examples II (arrangement of FIG. 12) while changing the positions of the slanted parts of the induction coil and the positions of the ends of the metal plate.

We heated Example 5 making the positions P where the slants of FIG. 12 end 50 mm inside from the ends of the metal plate for heating and Example 6 making the positions 50 mm to the outside from the ends of the metal plate for heating in the same way as Example 2. Note that, the positional relationship of the four sections of the induction coil and the metal plate were made the same.

Table 3 shows the results. In the case of Example 5, the temperature rise of the ends of the metal plate was small and the temperature of the center part of the metal plate was high, whereby the temperature deviation ratio became large. On the other hand, in the case of Example 6, the temperature at the end sides of the metal plate was high, while in Example 4 of Examples II, the ends of the metal plate had a slightly lower temperature than the center part of the metal plate, giving an almost uniform temperature. It was confirmed that the heating temperature distribution was changed by the position where the ends of the metal plate traversed the slanted parts of the induction coil.

TABLE 3

|  |  | Temperature deviation ratio | Comment |
|---|---|---|---|
| Present invention | Example 5 | 1.4 | Plate center temperature > Plate edge temperature |
|  | Example 6 | 1.3 | Plate center temperature < Plate edge temperature |

Examples IV

We arranged U-shaped ferrite cores (25 mm×15 mm cross-section, 170 mm aperture width, 220 mm height, 120 mm depth), while changing the positions attached to the steel plate edges, as shown in FIG. 13 and FIG. 14 at Example 3 which uses two sections of the induction coil tested in Examples II and conducted heating experiments in the same way as in Example 2.

In Example 7, when the ends of the metal plate and the ends of the magnetic cores (ends facing center part of metal plate) are aligned, the temperature deviation ratio drops slightly lower than Example 3 where there were no magnetic cores.

Further, in Example 8, in which the ends of the magnetic cores are positioned 20 mm inside from the ends of the metal plate, the temperature deviation ratio drops further to 1.23, whereas in Example 9, in which the ends of the magnetic cores are positioned 50 mm inside from the ends of the metal plate, the temperature deviation ratio drops further to 1.18, whereby it was confirmed that the temperature distribution can be controlled by the positions where the magnetic cores cover the ends of the metal plate.

TABLE 4

|  |  | Position covered by end of magnetic core from end of metal plate to center (mm) | Temperature deviation ratio | Comment |
|---|---|---|---|---|
| Invention examples | Example 7 | 0 | 1.28 | Plate center temperature < Plate edge temperature |
|  | Example 8 | 20 | 1.23 | Plate center temperature < Plate edge temperature |
|  | Example 9 | 50 | 1.18 | Plate center temperature < plate edge temperature |

INDUSTRIAL APPLICABILITY

As explained, the present heating system and heating method are capable of effective heating irrespective of the plate thickness and plate width and regardless of the material being magnetic or nonmagnetic.

That is, by using electricity, there is almost no thermal inertia in comparison to conventional gas heating methods, therefore operation conditions can be changed freely, heating to the desired temperature can be freely carried out, heating can be carried out at any heating rate at high temperature parts where it is difficult for heat to enter with radiant heating, and there is almost no idling or time required for startup, so the degree of freedom of operation is greatly increased. Further, changes in plate width and changes in plate thickness can be easily handled, so production plans and production itself can be carried out flexibly with few constraints.

Further, the installation space also can be greatly reduced compared with radiant heating and the construction costs can also be lowered. Further, the frequency of the heating power source used can be made an inexpensive comparatively low frequency of an easily handleable power source. The increase in coil voltage etc. proving a problem in high frequency heating can be easily avoided, and hardware limitations can be greatly eased.

Accordingly, the present invention has extremely high applicability across metal industries irrespective of being a ferrous metal industry or non-ferrous metal industry.

The invention claimed is:

1. An induction heating system for heating a metal plate, the metal plate having a length, sides across the length, a width, ends across the width, a center, a front surface side, and a back surface side, the induction heating system comprising:
an induction coil comprising at least two sections each formed by connecting a conductor at the front surface side of the metal plate and a conductor at the back surface side to circle the width of the metal plate at a distance from the front and back surfaces of the metal plate, the induction heating system configured for induction heating the metal plate passing through the induction coil encircling the metal plate, wherein
said at least two sections of the induction coil are arranged to adjoin along the length of the metal plate,
and, in a vertical projection of the conductors at the front surface side and back surface side onto the metal plate, the front surface side conductor and back surface side conductor are arranged a distance apart along the length of the metal plate such that the projections of the front and back surface conductors do not overlap at the center of the metal plate but overlap outside the ends of the metal plate, wherein,
at least one of the front surface side and back surface side conductors has a part slanted with respect to the width of the metal plate, and wherein
the front surface side conductors of the at least two sections are in proximity a first distance apart along the length of the metal plate, the back surface side conductors of the at least two sections are arranged a second distance apart along the length of the metal plate, and the second distance between the back surface side conductors is greater than the first distance between the front surface side conductors,
or the first distance between the front surface side conductors is greater than the second distance between the back surface side conductors.

2. The induction heating system as set forth in claim 1, wherein an alternating current, running through the induction coil, runs in the same direction and in the same phase in the conductors that are in proximity.

3. The induction heating system as set forth in claim 1, wherein at least one of the front surface side and back surface side conductors of the induction coil is arranged at a side along the length of the metal plate, and has a part slanted with respect to the width of the metal plate,
and at an outside of the slanted part, a magnetic core extends from the front surface side to the back surface side of the metal plate to cover a portion of an end of the metal plate.

4. The induction heating system as set forth in claim 3, further comprising a mechanism for moving the magnetic core in a horizontal direction, changing the area of the end of the metal plate covered by the magnetic core.

5. The induction heating system as set forth in claim 1, further comprising a mechanism enabling movement of the front surface side conductor or back surface side conductor in the direction of the width of the metal plate, and wherein the front surface side conductor or back surface side conductor has a part slanted with respect to the width of the metal plate that can change position with respect to the metal plate in the direction of the width.

6. A method for induction heating a metal plate using an induction heating system as set forth in claim 1, the induction heating method comprising:
    passing the metal plate through the induction coil of the induction heating system,
    running alternating current through the induction coil to run current in the same direction and in same phase through the conductors of the induction coil in proximity to each other, and thereby generating a master induction current inside the metal plate having substantially the same shape as a vertical projection of front surface side and back surface side conductors at the at least two sections of the induction coil onto the metal plate, wherein the master induction current has a direction opposite to the direction of the alternating current flowing through the front surface side and back surface side conductors,
    and, in a region outside the slanted part of an area formed by vertical projections of the front surface side and back surface side conductors onto the metal plate and sandwiched between the two adjoining sections, generating a minor loop of a first slave induction current by one of the adjoining sections of the induction coil and a minor loop of a second slave induction current by the other adjoining section of the induction coil, the first and second slave induction currents running in opposite directions in the minor loops, cancelling out the minor loops, and heating the metal plate while preventing generation of a net slave induction current.

7. The method for induction heating as set forth in claim 6, further comprising covering at least a portion of an end of the metal plate with a magnetic core, and changing the area of the end of the metal plate covered by the metal core, thereby changing the metal plate temperature at the end of the metal plate.

8. The method for induction heating as set forth in claim 6, further comprising moving at least one of the front surface side conductor and back surface side conductor along the width of the metal plate, and adjusting the slanted part of the conductor with respect to the metal plate to adjust the metal plate temperature distribution.

9. The method for induction heating as set forth in claim 7, wherein if the temperature at the end of the metal plate is high, the magnetic core is moved toward the inside of the metal plate so as to increase the area covered by the magnetic core, and if the temperature at the end of the metal plate is low, the magnetic core is moved away from the end of the metal plate so as to decrease the area covered by the magnetic core.

\* \* \* \* \*

UNITED STATES PATENT AND TRADEMARK OFFICE
CERTIFICATE OF CORRECTION

PATENT NO. : 8,502,122 B2  
APPLICATION NO. : 12/450855  
DATED : August 6, 2013  
INVENTOR(S) : Yoshiaki Hirota Page 1 of 1

It is certified that error appears in the above-identified patent and that said Letters Patent is hereby corrected as shown below:

On the Title Page of the patent, Item (57) Abstract, change

"The invention provides an induction heating system and method of using it for heating a metal plate. The induction coil of the induction heating system includes sections each having conductors at front and back surfaces of the metal plate, which are arranged such that at least a one of the front or back surface conductor has a part slanted in the width direction of the metal plate, and vertical projections of the conductors onto the metal plate do not overlap at the center of the metal plate but overlap outside the edges of the metal plate. In addition, front conductors from adjacent sections are spaced differently as back conductors. The induction heating system allows for better control of the heating temperature distribution regardless of the metal plates thickness and magnetic properties, especially temperature distributions at the edges of the metal plate."

to

-- The invention provides an induction heating system and method of using it for heating a metal plate. The induction coil of the induction heating system includes sections each having conductors at front and back surfaces of the metal plate, which are arranged such that at least one of the front or back surface conductor has a part slanted in the width direction of the metal plate, and vertical projections of the conductors onto the metal plate do not overlap at the center of the metal plate but overlap outside the edges of the metal plate. In addition, front conductors from adjacent sections are spaced differently as back conductors. The induction heating system allows for better control of the heating temperature distribution regardless of the metal plates thickness and magnetic properties, especially temperature distributions at the edges of the metal plate --.

Signed and Sealed this  
Twelfth Day of August, 2014

Michelle K. Lee  
*Deputy Director of the United States Patent and Trademark Office*

UNITED STATES PATENT AND TRADEMARK OFFICE
CERTIFICATE OF CORRECTION

PATENT NO. : 8,502,122 B2
APPLICATION NO. : 12/450855
DATED : August 6, 2013
INVENTOR(S) : Yoshiaki Hirota It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 448 days.

Signed and Sealed this
Fifteenth Day of September, 2015

Michelle K. Lee
*Director of the United States Patent and Trademark Office*